(12) United States Patent
Yamada

(10) Patent No.: US 10,375,275 B2
(45) Date of Patent: Aug. 6, 2019

(54) IMAGE PROCESSING APPARATUS SPECIFYING FIRST AND SECOND PIXELS, AND GENERATING PROCESSED IMAGE DATA IN WHICH THE FIRST AND SECOND PIXELS HAVE FIRST AND SECOND COLORS RESPECTIVELY

(71) Applicant: BROTHER KOGYO KABUSHIKI KAISHA, Nagoya, Aichi OT (JP)

(72) Inventor: Ryuji Yamada, Ogaki (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/933,762

(22) Filed: Mar. 23, 2018

(65) Prior Publication Data
US 2018/0288282 A1    Oct. 4, 2018

(30) Foreign Application Priority Data

Mar. 30, 2017 (JP) ................................. 2017-069377

(51) Int. Cl.
| | |
|---|---|
| *H04N 1/60* | (2006.01) |
| *H04N 1/409* | (2006.01) |
| *H04N 1/58* | (2006.01) |
| *H04N 1/48* | (2006.01) |
| *H04N 1/405* | (2006.01) |

(52) U.S. Cl.
CPC ............. *H04N 1/58* (2013.01); *H04N 1/4092* (2013.01); *H04N 1/486* (2013.01); *H04N 1/405* (2013.01)

(58) Field of Classification Search
None
See application file for complete search history.

(56) References Cited

U.S. PATENT DOCUMENTS

2013/0322747 A1* 12/2013 Ozawa ..................... H04N 1/58
382/164

FOREIGN PATENT DOCUMENTS

JP          H04-281671 A     10/1992

\* cited by examiner

*Primary Examiner* — Dov Popovici
(74) *Attorney, Agent, or Firm* — Scully, Scott, Murphy & Presser, P.C.

(57) ABSTRACT

An image processing apparatus specifies, from among target pixels in a target image, first pixels related to a first color, and determines whether a specific condition is met for each peripheral pixel of the target pixel. The specific condition includes a condition that each peripheral pixel is a candidate for a pixel representing one of colors different from the first color. The apparatus specifies, as a second pixel related to a second color, each peripheral pixel meeting the specific condition. The apparatus performs an image process on target image data by using specified first and second pixels to generate processed image data. In a processed image, first processed pixels correspond to the specified first pixels and have the first color, and second processed pixels correspond to the specified second pixels and have the second color.

16 Claims, 13 Drawing Sheets

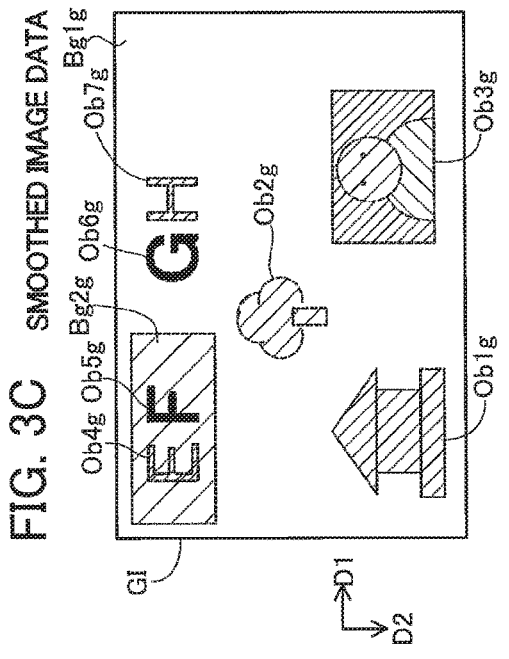
FIG. 3C SMOOTHED IMAGE DATA
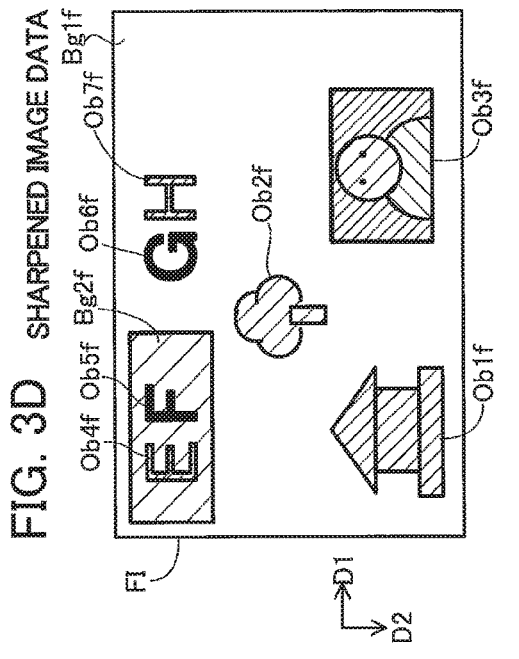
FIG. 3D SHARPENED IMAGE DATA
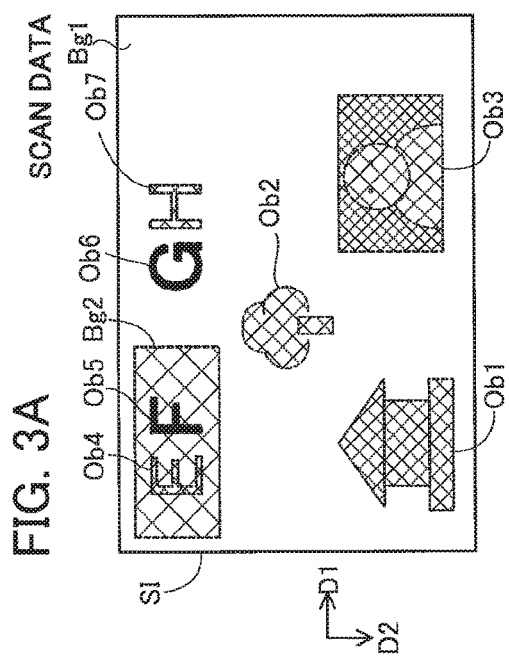
FIG. 3A SCAN DATA
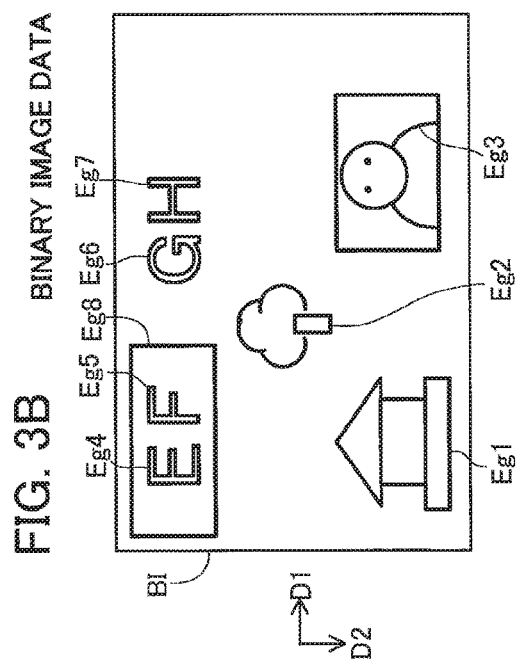
FIG. 3B BINARY IMAGE DATA

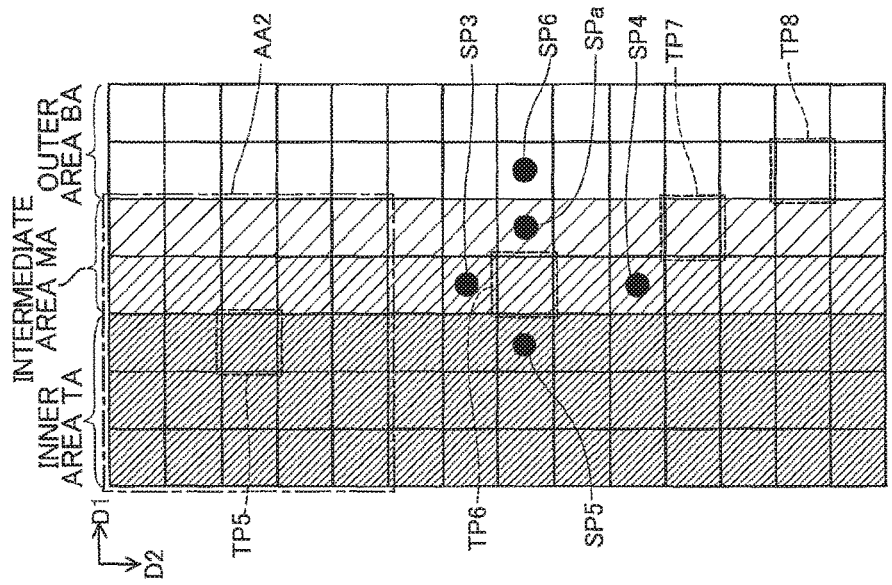

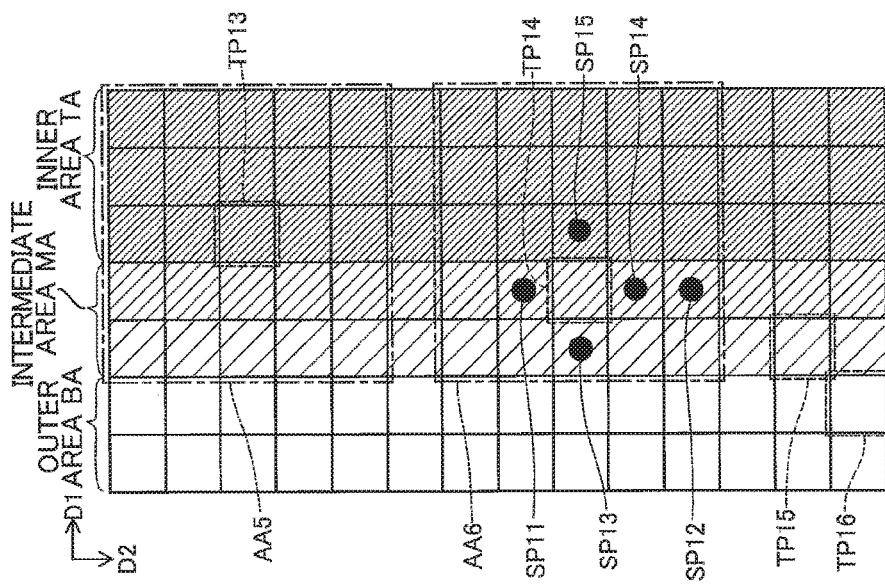

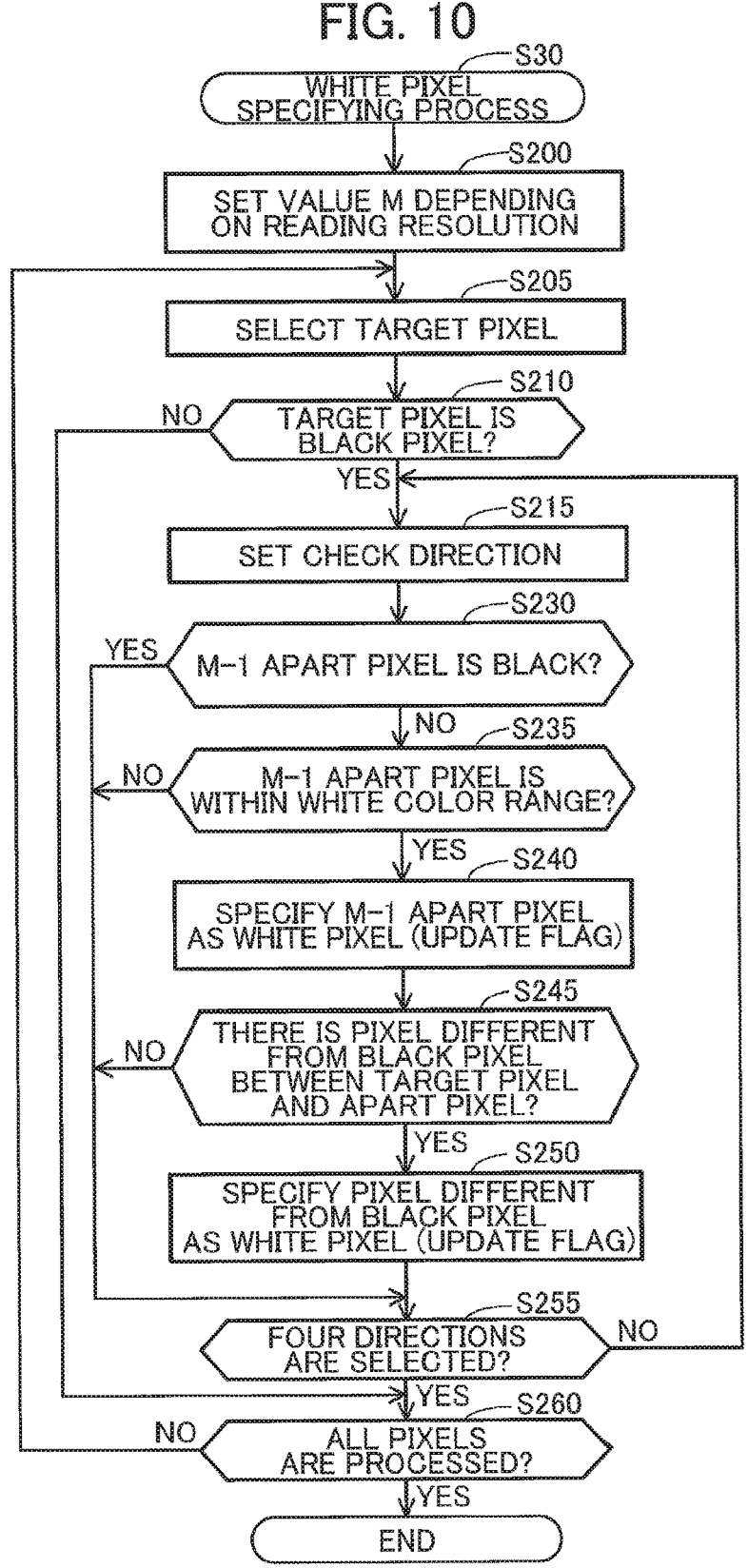

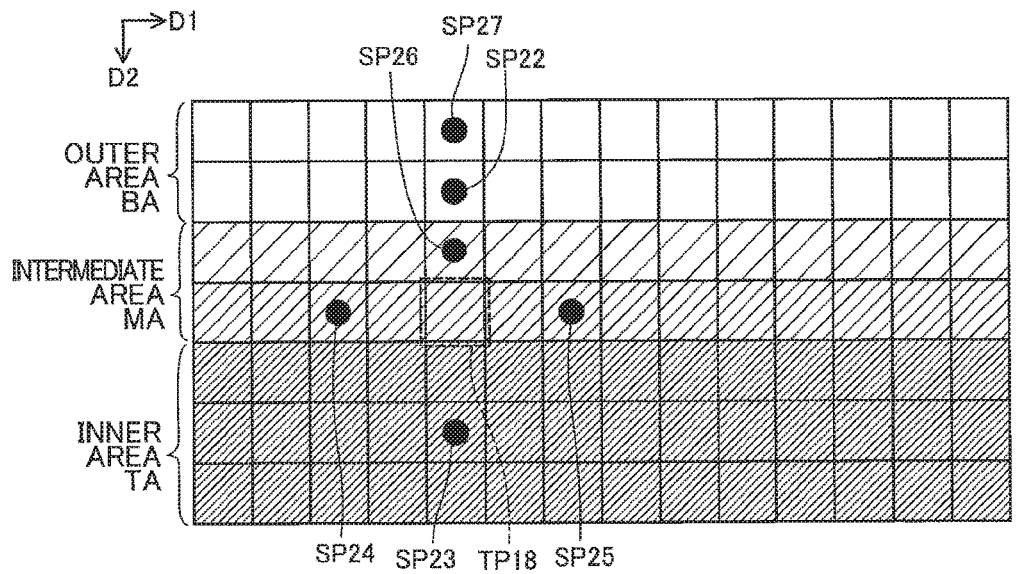

PROCESSED IMAGE (LOWER EDGE)

PROCESSED IMAGE (UPPER EDGE)

IMAGE PROCESSING APPARATUS SPECIFYING FIRST AND SECOND PIXELS, AND GENERATING PROCESSED IMAGE DATA IN WHICH THE FIRST AND SECOND PIXELS HAVE FIRST AND SECOND COLORS RESPECTIVELY

CROSS REFERENCE TO RELATED APPLICATION

This application claims priority from Japanese Patent Application No. 2017-069377 filed Mar. 30, 2017. The entire content of the priority application is incorporated herein by reference.

TECHNICAL FIELD

The present disclosure relates to an image process for emphasizing an edge in an image represented by image data.

BACKGROUND

A conventional image processing apparatus disclosed detects whether a target pixel is a "black edge" and detects whether a target pixel is a "white edge". The black edge indicates that the target pixel is a black pixel and that density in boundary between the target pixel and an peripheral pixel changes from white to black. The white edge indicates that the target pixel is a white pixel and density in boundary between the target pixel and an peripheral pixel changes from black to white. When the target pixel is the black edge, the image processing apparatus changes the multilevel of the target pixel to its maximum value (level representing complete black). When the target pixel is the white edge, the image processing apparatus changes the multilevel of the target pixel to its minimum value (level representing complete white).

SUMMARY

However, there is a possibility that the edge cannot be appropriately emphasized in the above technique. For example, when target image data is image data (e.g., scan data) generated using an image sensor, the value of a pixel in the edge region gently changes, thereby making it difficult to detect whether the target pixel is the white edge or whether the target pixel is the black edge. In such a case, there is a possibility that the edge cannot be appropriately emphasized. The same problem arises when clarifying the boundary between first and second colors.

In view of the foregoing, it is an object of the invention to provide a new technique that generates processed image data representing a processed image in which a boundary between first and second colors in a target image is appropriately clarified.

In order to attain the above and other objects, the disclosure provides an image processing apparatus including a processor. The processor is configured to perform: acquiring target image data representing a target image, the target image including a plurality of pixels, the plurality of pixels having respective ones of a plurality of pixel values, each of the plurality of pixel values having a gradation value, total levels of the gradation value being larger than three; specifying a plurality of target pixels from among the plurality of pixels; specifying a plurality of first pixels from among the plurality of target pixels, each of the plurality of first pixels being a candidate for a pixel representing a first color; specifying a plurality of peripheral pixels of each first pixel which is located within a prescribed range from the each first pixel; determining whether a specific condition is met for each peripheral pixel, the specific condition including a condition that the each peripheral pixel is a candidate for a pixel representing one of colors different from the first color, wherein a plurality of distant pixels of the each first pixel is located out of the prescribed range from the each first pixel, is not specified as a peripheral pixel of the each first pixel, and is free from determining whether the specific condition is met; specifying, as a second pixel, each of the plurality of peripheral pixels meeting the specific condition, the second pixel being a candidate for a pixel representing a second color different from the first color; and performing an image process on the target image data by using each of specified first pixels and each of specified second pixels to generate processed image data representing a processed image. The processed image includes a plurality of first processed pixels, a plurality of second processed pixels, and a plurality of processed third pixels, the plurality of first processed pixels corresponding to respective ones of the specified first pixels and having the first color, the plurality of second processed pixel corresponding to respective ones of the specified second pixels and having the second color, each of the plurality of processed third pixels having a color different from the first color and the second color and corresponding to a pixel in the target image for which the determining whether the specific condition is met has not been performed.

According to another aspects, the disclosure provides a non-transitory computer readable storage medium storing a set of program instructions for installed on and executed by a computer. The set of program instructions includes: acquiring target image data representing a target image, the target image including a plurality of pixels, the plurality of pixels having respective ones of a plurality of pixel values, each of the plurality of pixel values having a gradation value, total levels of the gradation value being larger than three; specifying a plurality of target pixels from among the plurality of pixels; specifying a plurality of first pixels from among the plurality of target pixels, each of the plurality of first pixels being a candidate for a pixel representing a first color; specifying a plurality of peripheral pixels of each first pixel which is located within a prescribed range from the each first pixel; determining whether a specific condition is met for each peripheral pixel, the specific condition including a condition that the each peripheral pixel is a candidate for a pixel representing one of colors different from the first color, wherein a plurality of distant pixels of the each first pixel is located out of the prescribed range from the each first pixel, is not specified as a peripheral pixel of the each first pixel, and is free from determining whether the specific condition is met; specifying, as a second pixel, each of the plurality of peripheral pixels meeting the specific condition, the second pixel being a candidate for a pixel representing a second color different from the first color; and performing an image process on the target image data by using each of specified first pixels and each of specified second pixels to generate processed image data representing a processed image. The processed image includes a plurality of first processed pixels, a plurality of second processed pixels, and a plurality of processed third pixels, the plurality of first processed pixels corresponding to respective ones of the specified first pixels and having the first color, the plurality of second processed pixel corresponding to respective ones of the specified second pixels and having the second color, each of the plurality of processed third pixels having a color different from the first color and the second color and corresponding to a pixel in the target image for which the determining whether the specific condition is met has not been performed.

According to still another aspects, the disclosure provides an image processing method. The image processing method includes: acquiring target image data representing a target image, the target image including a plurality of pixels, the plurality of pixels having respective ones of a plurality of pixel values, each of the plurality of pixel values having a gradation value, total levels of the gradation value being larger than three; specifying a plurality of target pixels from among the plurality of pixels; specifying a plurality of first pixels from among the plurality of target pixels, each of the plurality of first pixels being a candidate for a pixel representing a first color; specifying a plurality of peripheral pixels of each first pixel which is located within a prescribed range from the each first pixel; determining whether a specific condition is met for each peripheral pixel, the specific condition including a condition that the each peripheral pixel is a candidate for a pixel representing one of colors different from the first color, wherein a plurality of distant pixels of the each first pixel is located out of the prescribed range from the each first pixel, is not specified as a peripheral pixel of the each first pixel, and is free from determining whether the specific condition is met; specifying, as a second pixel, each of the plurality of peripheral pixels meeting the specific condition, the second pixel being a candidate for a pixel representing a second color different from the first color; and performing an image process on the target image data by using each of specified first pixels and each of specified second pixels to generate processed image data representing a processed image. The processed image includes a plurality of first processed pixels, a plurality of second processed pixels, and a plurality of processed third pixels, the plurality of first processed pixels corresponding to respective ones of the specified first pixels and having the first color, the plurality of second processed pixel corresponding to respective ones of the specified second pixels and having the second color, each of the plurality of processed third pixels having a color different from the first color and the second color and corresponding to a pixel in the target image for which the determining whether the specific condition is met has not been performed.

BRIEF DESCRIPTION OF THE DRAWINGS

The particular features and advantages of the disclosure as well as other objects will become apparent from the following description taken in connection with the accompanying drawings, in which:

FIGS. 3A-3D are illustrating examples of an image used in the image process, wherein FIG. 3A illustrates an example of a scan image SI represented by the scan data, FIG. 3B illustrates an example of a binary image BI represented by the binary image data, FIG. 3C illustrates a smoothed image GI represented by the smoothed image data, and FIG. 3D illustrates a sharpened image FI represented by the sharpened image data;

FIGS. 4A-4C are views explaining an expansion process and a contraction process, wherein FIG. 4A illustrates a partial image PI1 of the binary image BI, FIG. 4B illustrates an expansion-processed partial image PI2, and FIG. 4C illustrates a contraction-processed partial image PI3;

FIGS. 6A and 6B are first explanatory views of a black pixel specifying process, wherein FIG. 6A illustrates an enlarged view of a lower edge of the scan image and FIG. 6B illustrates flag data corresponding to the area in the scan image SI illustrated in FIG. 6A;

FIGS. 7A and 7B are second explanatory views of the black pixel specifying process, wherein FIG. 7A illustrates an enlarged view of a right edge of the scan image and FIG. 7B illustrates flag data corresponding to the area in the scan image SI illustrated in FIG. 7A;

FIGS. 8A and 8B are third explanatory views of the black pixel specifying process, wherein FIG. 8A illustrates an enlarged view of an upper edge of the scan image and FIG. 8B illustrates the flag data corresponding to the area in the scan image SI illustrated in FIG. 8A;

FIGS. 9A and 9B are fourth explanatory views of the black pixel specifying process, wherein FIG. 9A illustrates an enlarged view of a left edge of the scan image and FIG. 9B illustrates the flag data corresponding to the area in the scan image SI illustrated in FIG. 9A;

FIG. 10 is a flowchart illustrating a white pixel specifying process;

FIGS. 11A and 11B are first explanatory views of white pixel specifying process, wherein FIG. 11A illustrates an enlarged view of the lower edge and FIG. 11B illustrates flag data corresponding to an area in the scan image SI illustrated in FIG. 11A;

FIGS. 12A and 12B are second explanatory views of the white pixel specifying process, wherein FIG. 12A illustrates an enlarged view of the upper edge and FIG. 12B illustrates flag data corresponding to the area in the scan image SI illustrated in FIG. 12A.

DETAILED DESCRIPTION

A. Embodiment

A-1: Configuration of Multifunction Peripheral 200

Figure 1:
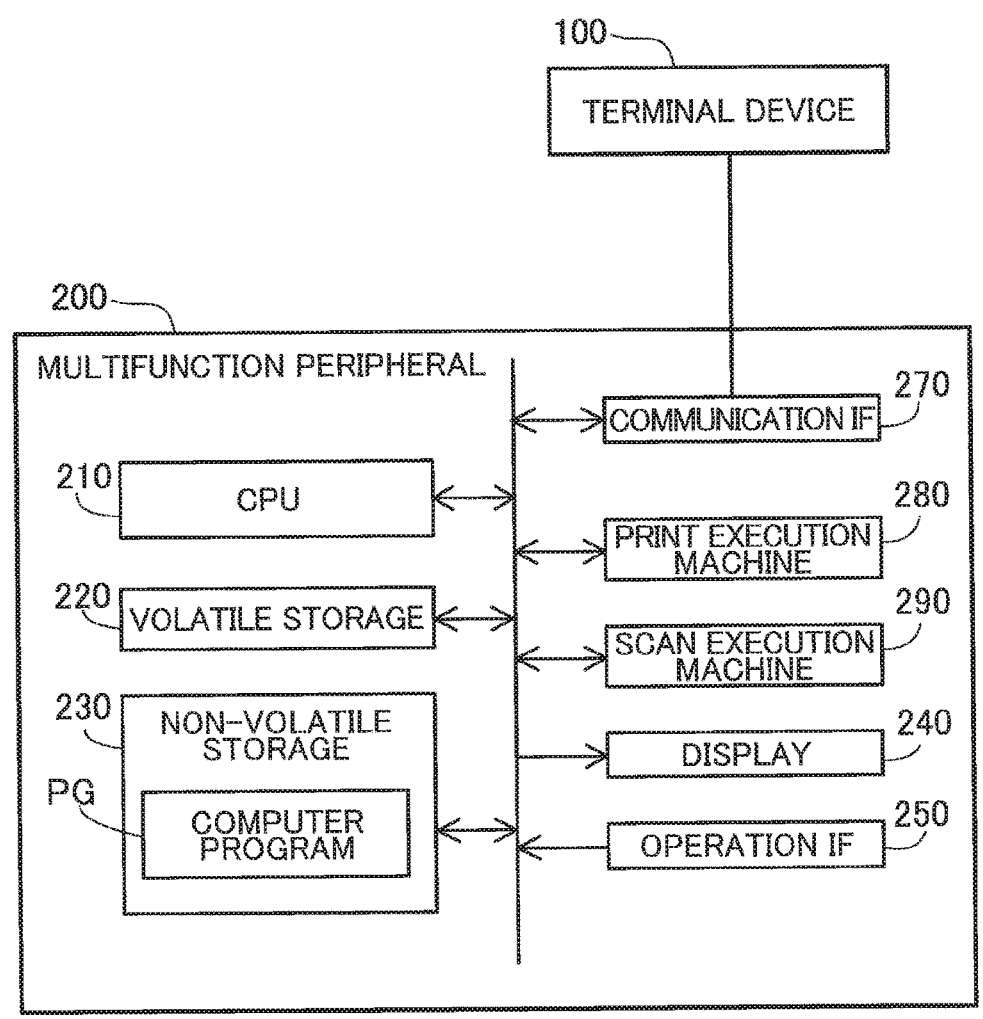
FIG. 1 is a block diagram illustrating a configuration of a multifunction peripheral.

An image processing apparatus according to an embodiment will be described while referring to the accompanying drawings. FIG. 1 is a block diagram illustrating the configuration of a multifunction peripheral 200 as an example of the image processing apparatus. The multifunction peripheral 200 includes a central processing unit (CPU) 210 which is a processor for controlling the multifunction peripheral 200, a volatile storage 220 such as a dynamic random access memory (DRAM), a non-volatile storage 230 such as a flash memory, a hard disk drive, or the like, a display 240 including a liquid crystal display and the like, an operation interface 250 including a touch panel and buttons superimposed on the liquid crystal display, an communication interface 270 for communicating with an external device such as a user terminal device 100, a print execution machine 280, and a scan execution machine 290.

The scan execution machine 290 optically reads an original using an one-dimensional image sensor according to control of the CPU 210 to generate scan data. The print execution machine 280 prints an image onto a print medium such as a paper sheet with a laser according to control of the CPU 210 by using a plurality of types of toner, specifically toner in the colors cyan (C), magenta (M), yellow (Y), and black (K), as coloring materials. More specifically, the print execution machine 280 exposes a photosensitive drum (not shown) to form an electrostatic latent image and makes the toner adhere to the electrostatic latent image to thereby form a toner image. The print execution machine 280 transfers the toner image formed on the photosensitive drum (not shown) onto the paper sheet. The print execution machine 280 may employ an inkjet method which forms an image onto a paper sheet by ejecting ink as coloring materials.

The volatile storage 220 provides a buffer area for temporarily storing various intermediate data generated when the CPU 210 performs processing. The non-volatile storage 230 stores a computer program PG therein. The computer program PG is a control program allowing the CPU 210 to perform control of the multifunction peripheral 200. In the present embodiment, the computer program PG is previously stored in the non-volatile storage 230 at the time of manufacturing the multifunction peripheral 200. Alternatively, the computer program PG may be provided by being downloaded from a server or by being stored in a DVD-ROM and the like. The CPU 210 executes the computer program PG to thereby execute an image process to be described later.

A-2: Image Process

Figure 2:
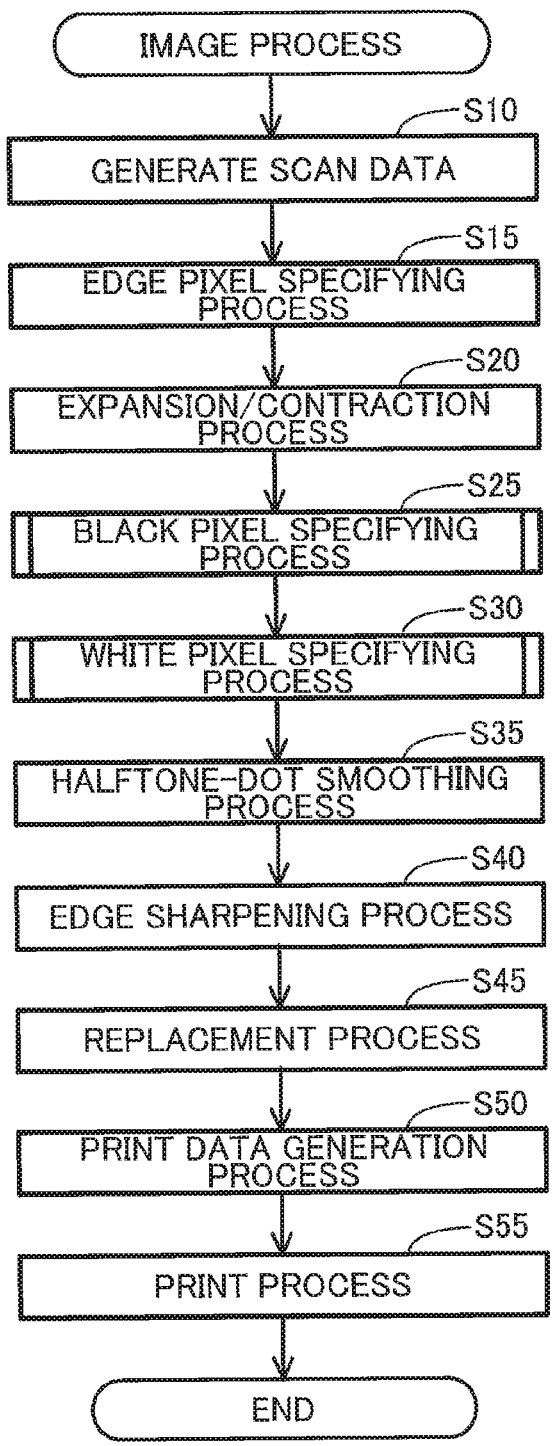
FIG. 2 is a flowchart illustrating steps in an image process.

FIG. 2 is a flowchart illustrating steps in the image process. The image process is executed when, for example, a user places an original on a platen of the scan execution machine 290 and inputs a copy execution instruction through the operation interface 250. The image process acquires scan data generated by the scan execution machine 290 reading the original and, from the scan data, generates print data representing the original to thereby copy the original.

In S10, the CPU 210 reads the original placed on the platen by the user using the scan execution machine 290 to generate scan data as target image data. The original is a printed matter on which an image is printed by, for example, the multifunction peripheral 200 or an unillustrated printer. The generated scan data is stored in the buffer area of the volatile storage 220 (FIG. 1). Thus, the CPU 210 acquires the scan data of the original as the target image data. The scan data is RGB image data including a plurality of pixels. The color of each pixel in the scan data is represented by a color value (or an RGB value) in color coordinate system. The RGB value of one pixel includes three component values of, for example, red (R), green (G), and blue (B) (hereinafter, referred to also as "R value", "G value", and "B value"). In the present embodiment, the number of gradations of each component value is 256. The number of gradations of each color value is not limited to 256, and may be the number greater than or equal to 3, such as 64 or 128.

FIGS. 3A-3C are illustrating examples of an image used in the image process. FIG. 3A illustrates an example of a scan image SI represented by the scan data. The scan image SI is made up of a plurality of pixels arranged in a matrix form in which the pixels are arranged in rows (first direction D1) and columns (second direction D2). The second direction D2 is orthogonal to the first direction D1.

The scan image SI of FIG. 3A includes a white background Bg1 representing the base color of the original document, three objects Ob1 to Ob3 different from characters, four characters Ob4 to Ob7, and a background Bg2 of the two characters Ob4 and Ob5. Each object different from characters are a photo or a drawing for example. The characters Ob5 and Ob6 are black characters. The characters Ob4 and Ob7 are characters having a color different from black, such as blue or red. The background Bg2 is a uniform image having a color different from white.

In S15, the CPU 210 performs an edge pixel specifying process on the scan data. The edge pixel specifying process is a process specifying a plurality of edge pixels constituting an edge in the scan image SI from among all the edge pixels constituting the scan image SI. As a result of the above edge pixel specifying process, binary image data is generated. Here, in the binary image data, the values of the edge pixel and non-edge pixel are set to "1" and "0" for example, respectively.

Specifically, the CPU 210 uses the scan data to generate luminance image data representing the luminance of each of the plurality of pixels in the scan image SI. Luminance Y can be calculated using the RGB value (R, G, and B) according to the following expression for example: $Y=0.299 \times R + 0.587 \times G + 0.114 \times B$. The CPU 210 applies a so-called Sobel filter to the value of each pixel in the luminance image data to calculate edge strength Se. The CPU 210 generates edge strength data in which the value of each pixel is represented by an edge strength Se.

The following shows a calculation expression (1) of the edge strength. A gradation value P (x, y) in the expression (1) indicates the gradation value of a specific pixel position (x, y) in a luminance image. The position x indicates a pixel position in the first direction D1, and the position y indicates a pixel position in the second direction D2. An edge strength Se (x, y) at the pixel position (x, y) in the luminance image are calculated using the values of nine pixels arrayed in a 3×3 matrix (including a pixel at the pixel position (x, y) as the center and eight pixels surrounding the pixel position (x, y)). Each of the first and second terms in the calculation expression (1) is an absolute value of the sum of the values obtained by multiplying the gradation values of the pixels at the nine positions by their corresponding coefficients. The first term is a differential of the gradation value in the first direction D1 (i.e., a differential regarding the horizontal direction), and the second term is a differential of the gradation value in the second direction D2 (i.e., a differential regarding the vertical direction). The calculated edge strength Se (x, y) is normalized to 256 gradation values from 0 to 255.

Expression (1)

$$Se(x, y) = \left\| \begin{bmatrix} -1 & 0 & 1 \\ -2 & 0 & 2 \\ -1 & 0 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right\| + \left\| \begin{bmatrix} -1 & -2 & -1 \\ 0 & 0 & 0 \\ 1 & 2 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right\|$$

The CPU 210 performs a binarization process on the edge strength data to generate binary image data. For example, the CPU 210 classifies a pixel having a value (i.e., edge strength) equal to or larger than a threshold value (e.g., 128) in the edge image data into an edge pixel and classifies a pixel in the binary image data having a value smaller than the threshold value into a non-edge pixel in the binary image data. Here, the binary image data includes a binary image having a plurality of pixels respectively corresponding to the plurality of pixels in the scan image SI. The edge pixel of the binary image indicates that a corresponding pixel in the scan image SI is an edge pixel representing a part of edge. The non-edge pixel of the binary image indicates that a corresponding pixel in the scan image is an non-edge pixel representing a part of non-edge image. That is, when a pixel is the edge pixel in the binary image, a corresponding pixel in the scan data is an edge pixel. When a pixel is the non-edge pixel in the binary image, a corresponding pixel in the scan data is the non-edge pixel. Accordingly, the plurality of edge pixels in the scan image SI are specified.

FIG. 3B illustrates an example of a binary image BI represented by the binary image data. In the binary image BI, a plurality of edge pixels constituting edges Eg1 to Eg7 of the objects Ob1 to Ob7 in the scan image SI and a plurality of edge pixels constituting an edge Eg8 as the boundary between the backgrounds Bg1 and Bg2 are specified. Thus, the edges mainly include the edges of characters. The edges further include edges such as thin lines included in the objects (e.g., a drawing or a photo) different from characters.

In S20, the CPU 210 performs an expansion/contraction process on the generated binary image data to generate expansion/contraction-processed binary image data. The expansion/contraction process includes an expansion process expanding edges constituted by the plurality of specified edge pixels and a contraction process contracting the expansion-processed edges. Each of the expansion process and the contraction process is repeatedly executed prescribed number of times (e.g., two times).

Figure 4A:
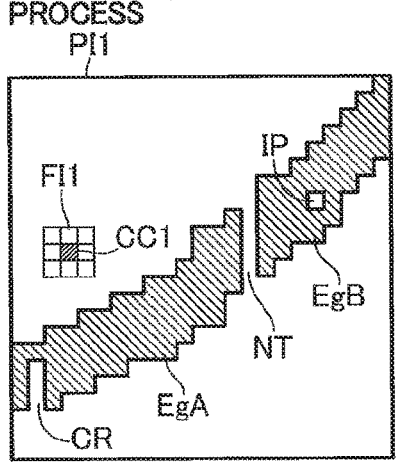
Figure 4B:
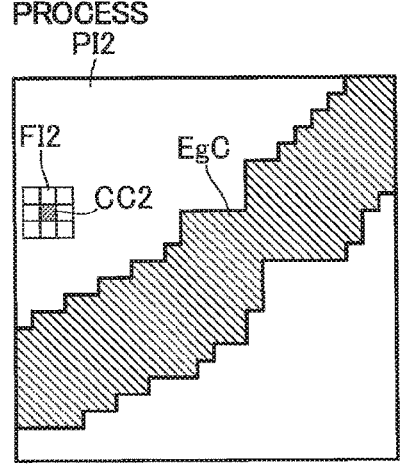
Figure 4C:
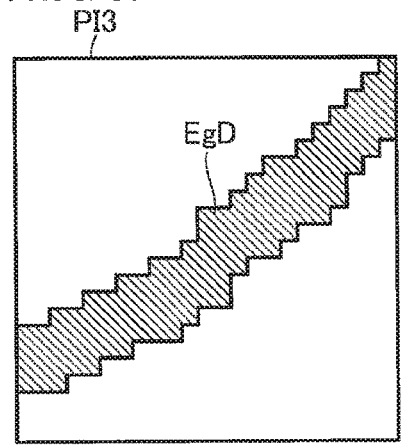

FIGS. 4A-4C are views explaining the expansion process and the contraction process. FIG. 4A illustrates a partial image PI1 of the binary image BI (FIG. 3B). The partial image PI1 includes edges EgA and EgB before the expansion process is performed. The two edges EgA and EgB are separated from each other by a gap NT. The edge EgA includes a crack CR, and the edge EgB includes an isolated non-edge pixel IP. When an edge corresponding to one continuous line or character includes the gap NT, the crack CR, and the isolated non-edge pixel IP, they are preferably removed for a black pixel specifying process of S25, which will be described later. That is, the expansion process and the contraction process are executed for removing the gap NT, the crack CR, and the isolated non-edge pixel IP.

The expansion process is applied to the binary image data representing the binary image BI using a filter having a prescribed size (in the example of FIG. 4A, a filter FI1 having a size of 3×3 pixels (horizontally arranged pixels× vertically arranged pixels)). Specifically, the CPU 210 applies the filter FI1 to the binary image data to generate expansion-processed binary image data. That is, the CPU 210 locates the filter FI1 on the binary image BI including the partial image PI1 so that a center position CC1 (see FIG. 4A) of the filter FI1 overlaps a target pixel. When there is any edge pixel in the range of the filter FI1, the CPU 210 defines a pixel of the expansion-processed binary image (not illustrated) corresponding to the target pixel so that the defined pixel is set as an edge pixel. When there is no edge pixel in the range of the filter FI1, that is, when all the nine pixels in the range of the filter FI1 are the non-edge pixels, the CPU 210 defines a pixel of the expansion-processed binary image (not illustrated) corresponding to the target pixel so that the defined pixel is set as a non-edge pixel. The CPU 210 sequentially selects all the pixels in the binary image BI as the target pixel and sets the corresponding pixel in the expansion-processed binary image to one of the edge and non-edge pixels, thereby generating the expansion-processed binary image data representing the expansion-processed binary image.

FIG. 4B illustrates an expansion-processed partial image PI2 of the expansion-processed binary image corresponding to the partial image PI1 of FIG. 4A. As shown in FIG. 4B, the abovementioned gap NT, the crack CR, and the isolated non-edge pixel IP are removed from the expansion-processed partial image PI2. Further, in the expansion-processed partial image PI2, one edge EgC corresponding to the edges EgA and EgB of the partial image PI1 of FIG. 4A is thicker than (expanded as compared to) the edges EgA and EgB.

The contraction process is applied to the expansion-processed binary image data using a filter having a prescribed size (in the example of FIG. 4B, a filter FI2 having a size of 3×3 pixels (length×width)). Specifically, the CPU 210 applies the filter FI2 to the binary image data representing the expansion-processed binary image to generate contraction-processed binary image data. That is, the CPU 210 locates the filter FI2 on the expansion-processed binary image BI so that a center position CC2 (see FIG. 4B) of the filter FI2 overlaps a target pixel. When there is a non-edge pixel in the range of the filter FI2, the CPU 210 defines a pixel of the contraction-processed binary image (not illustrated) corresponding to the target pixel so that the defined pixel is set as an non-edge pixel. When there is no non-edge pixel in the range of the filter FI2, that is, when all the nine pixels in the range of the filter FI2 are the edge pixels, the CPU 210 defines a pixel of the contraction-processed binary image (not illustrated) corresponding to the target pixel so that the defined pixel is set as an edge pixel. The CPU 210 sequentially selects all the pixels in the expansion-processed binary image BI as the target pixel and sets the corresponding pixel in the contraction-processed binary image to one of the non-edge and edge pixels, thereby generating the contraction-processed binary image data representing the contraction-processed binary image.

FIG. 4C illustrates a contraction-processed partial image PI3 of the contraction-processed binary image corresponding to the partial image PI1 of FIG. 4A. The gap NT, the crack CR, and the isolated non-edge pixel IP do not appear in the partial image PI3. One edge EgD corresponding to the edges EgA and EgB of the partial image PI1 of FIG. 4A is contracted to a thickness almost the same as those of the edges EgA and EgB. When such expansion process and the contraction process are repeated a plurality of times, almost all the pixels constituting a comparatively small character, e.g., a character of 12 points or less are specified as the edge pixel.

The sizes of the respective filters FI1 and FI2, that is, the degree of expansion by the expansion process and the degree of contraction by the contraction process are merely examples. For example, the filters FI1 and FI2 may each be a filter having a size of 5×5 pixels or 7×7 pixels (horizontally arranged pixels×vertically arranged pixels). In the finally generated expansion/contraction-processed binary image data, the edges therein are expanded as compared to those in the binary image data before the expansion/contraction process so that a plurality of pixels constituting a blurred portion in the edge of a character or the like are specified as the edge pixel without omission.

The expansion/contraction-processed binary image data is hereinafter referred to merely as "binary image data", and the edge pixel specified in the expansion/contraction-processed binary image data is referred to merely as "edge pixel".

In S25 of FIG. 2, the CPU 210 executes the black pixel specifying process using the expansion/contraction-processed binary image data and the target image data. The black pixel specifying process specifies a plurality of black pixels from among the plurality of pixels in the scan image SI.

The black pixel indicates a pixel in the scan image SI that should have a black color. In other words, the black pixel is a pixel having a color which is inferred to represent the black color. Or, the black pixel is a candidate for a pixel representing the black color. For example, the printed pixels corresponding to the black characters Ob5 and Ob6 of the scan image SI (FIG. 2A) have a black color on the original document, thus the pixel constituting the black characters Ob5 and Ob6 in the scan image SI (FIG. 3A) are the black pixels that should have a black color. In an image represented by image data like scan data generated using the image sensor, so-called blurring may occur particularly in the edge portion. Thus, on the scan image SI, among the plurality of pixels constituting the black characters Ob5 and Ob6, pixels located at the edge can have a color other than black, e.g., a color having a lighter color or a higher chroma than the black color. So, in the present embodiment, the black pixel can have the black color or a color other than black. In the black pixel specifying process of the present example, the plurality of edge pixels constituting a black character on a white background (in the example of FIG. 3A, character Ob6 on the background Bg1) is specified as the black pixels.

Flag data representing the plurality of specified black pixels is generated in the black pixel specifying process. The flag data includes flags corresponding to the plurality of respective pixels in the scan image SI. In the flag data, the value of the flag corresponding to a pixel specified as the black pixel indicates a value (e.g., "1") representing the black pixel. Details of the black pixel specifying process will be described later.

In S30 of FIG. 2, the CPU 210 executes a white pixel specifying process using the target image data and the flag data representing the plurality of specified black pixels. The white pixel specifying process specifies a plurality of white pixels from among the plurality of pixels in the scan image SI. The white pixel indicates a pixel in the scan image SI that should have a white color. In other words, the white pixel is a pixel having a color inferred to represent the white color. Or, the white pixel is a candidate for a pixel representing a white color. For example, the pixels constituting the white background Bg1 (FIG. 3A) representing the base color of the original document are the white pixels that should have a white color. However, in an image like scan data, because of the blurring, when pixels, which are among the plurality of pixels constituting the background Bg1, are located at the edge of the background Bg1 adjacent to an object, the pixels at the edge can have a color other than white, e.g., a color having a darker color or a higher chroma than the white color. So, in the present embodiment, the white pixel can have the white color or a color other than white. In the white pixel specifying process, a plurality of white pixels located around the black pixels are specified so as to clarify the edge constituting the boundary between the black color and the white color. For example, in the example of FIG. 3A, pixels, which are among the pixels constituting the background Bg1 and located along the edge of the background Bg1 adjacent of the black character Ob6, are specified as the white pixel.

The plurality of white pixels specified by the white pixel specifying process are recorded in the above flag data. For example, in the flag data after the white pixel specifying process, the value of the flag corresponding to a pixel specified as the white pixel indicates a value (e.g., "2") representing the white pixel. Details of the white pixel specifying process will be described later. In the flag data, the value of the flag corresponding to a pixel specified as the white pixel indicates a value (e.g., "2") representing the white pixel, and the value of the flag corresponding to a pixel specified neither the black pixel nor the white pixel indicates a value (e.g., "0") representing a pixel other than the black pixel and the white pixel.

By the black pixel specifying process of S25 and the white pixel specifying process of S30, the flag data representing a plurality of black pixels, a plurality of white pixels, and a plurality of pixels which is neither the black pixel nor white pixel is generated.

In S35, the CPU 210 performs a halftone-dot smoothing process on the scan data to generate smoothed image data representing a smoothed image. Specifically, the CPU 210 applies a smoothing process to each of values of non-edge pixels in the scan data by using a smoothing filter such as a Gauss filter to calculate the smoothed values of non-edge pixels in smoothed image data. Here, each non-edge pixel in the scan data to be subjected to the smoothing process is specified by referring to the non-edge pixel of the binary image data generated in the expansion/contraction process of S20. The CPU 210 generates the smoothed image data representing a smoothed image having edge pixels and the non-edge pixels. The smoothed image data includes the values of the edge pixels in the scan data and the calculated smoothed values of the non-edge pixels.

FIG. 3C illustrates a smoothed image GI represented by the smoothed image data. The smoothed image GI includes a white background Bg1g, objects Ob1g to Ob7g and a background Bg2g obtained by smoothing the objects Ob1 to Ob7 and background Bg2 in the scan image SI. Portions (non-edge portions) of the objects Ob1g to Ob7g and the background Bg2g other than the edges thereof are smoother than those of the objects Ob1 to Ob7 and the background Bg2 in the scan image SI.

In S40, the CPU 210 performs an edge sharpening process to the smoothed image data to generate sharpened image data. Specifically, the CPU 210 applies a sharpening process such as an unsharp mask and/or a process applying a sharpening filter to each of the values of edge pixels in the smoothed image data to calculate the sharpened values of edge pixels in the sharpened image data. Each edge pixel to be subjected to the sharpening process is specified by referring to the edge pixel in the binary image data generated in the expansion/contraction process of S20. The CPU 210 generates sharpened image data representing a sharpened image having non-edge pixels and the edge pixels. The sharpened image data includes the smoothed values of the non-edge pixels included in the smoothed image data and the calculated sharpened values of the edge pixels. The values of the edge pixels included in the smoothed image data are not targets of the edge sharpening process, and thus the valued of the edge pixels in the sharpened image data are the same as the values of the edge pixels included in the scan data. Therefore, the edge sharpening process in this step is applied to the values of the edge pixels included in the scan data.

FIG. 3D illustrates a sharpened image FI represented by the sharpened image data. The sharpened image H includes a white background Bg1*f* and objects Ob1*f* to Ob7*f* and a background Bg2*f* corresponding to the objects Ob1 to Ob7 and the background Bg2 in the scan image SI. The edges of the objects Ob1*f* to Ob7*f* and the background Bg2*f* are sharper than those of the objects Ob1 to Ob7 and background Bg2 in the scan image SI and those of the objects Ob1g to Ob7g and background Bg2g in the smoothed image GI.

The objects Ob1f to Ob7f and the background Bg2f in the sharpened image FI include the sharpened edges and smoothened non-edge portions.

In S45, the CPU 210 performs a replacement process on the sharpened image data to generate processed image data representing a processed image. The replacement process is executed by using positional data regarding the black pixels specified by the black pixel specifying process and positional data regarding the white pixels specified by the white pixel specifying process. Specifically, the replacement process includes a process replacing the colors of black pixels in the sharpened image H with black and a process replacing the colors of white pixels in the sharpened image H with white. Here, the black pixels in the sharpened image FI correspond to the black pixels in the scan image specified by the black pixel specifying process of S25. The white pixels in the sharpened image FI correspond to the white pixels in the scan image SI specified by the white pixel specifying process of S30. These black pixels and white pixels are specified by referring to the flag data described above. Colors of pixels which are specified neither the black pixel nor the white pixel are not changed in the replacement process.

Specifically, the CPU 210 replaces the value (RGB value) of each of the plurality of black pixels in the sharpened image data with the RGB value representing black (R, G, B)=(0, 0, 0). The CPU 210 replaces the value of each of the plurality of white pixels in the sharpened image data with the RGB value representing white (R, G, B)=(255, 255, 255).

In S50, the CPU 210 executes a print data generation process to generate print data using the processed image data. Specifically, the CPU 210 applies a color conversion process to the processed image data which is RGB image data to generate CMYK image data representing the color of each pixel by a CMYK value which is a color value having color components (components of C, M, Y, and K) corresponding to color materials used in printing. The color conversion process is executed by referring to, for example, a known look-up table. A halftone process is applied to the CMYK image data to generate dot data representing a dot formation state for each pixel and each color material to be used in printing. The dot formation state can include, for example, two states of "dot" and "no dot" or four states of "large dot", "medium dot", "small dot", and "no dot". The halftone process is executed according to a dither method or an error diffusion method for example. The dot data are rearranged in the order to be used in printing, and a printing command is added to the rearranged dot data to generate print data.

In S55, the CPU 210 executes the print process and ends the image process. Specifically, the CPU 210 supplies the print data to the print execution machine 280 to make the print execution machine 280 print the processed image.

According to the image process described above, the CPU 210 applies the replacement process to the sharpened image data in S45 so that the boundary between black and white can be clarified. For example, as shown in FIG. 3D, colors of pixels, which are among the pixels constituting the black character Ob6f in the sharpened image FI and located at the edge of the black character Ob6f adjacent to the white background Bg1f, are changed to black by the replacement process. Further, colors of pixels, which are among the pixels constituting the white background Bg1f in the sharpened image FI and located at the edge of the white background Bg1f adjacent to the black character Ob6f, are changed to white. As a result, in the processed image, blurring of the edge portion of the black character Ob6f is reduced, thereby clarifying the edge of the black character Ob6f on the white background Bg1f, i.e., the boundary between white of the background and black of the character. This can improve appearance of particularly the black character Ob6f on the white background Bg1f.

Further, the image process (S35 and S40) including the halftone-dot smoothing process (S35) is executed on the scan data to generate the intermediate image data (sharpened image data generated in S40), and the generated intermediate image data is used to generate the processed image data (S45). As a result, processed image data representing a smoothed processed image in which the boundary between black and white is appropriately clarified can be generated.

Further, in the processed image data, smoothed values that have been subjected to the smoothing process are used for the non-edge pixels constituting a uniform portion such as the background Bg2f having a color different from white and a portion different from the edge of the object. As a result, halftone dots causing, e.g., moire can be suppressed from appearing in a portion different from the edge in the processed image. Accordingly, problems, such as occurrence of moire in the processed image to be printed, can be suppressed, thereby improving appearance of the processed image to be printed.

For example, the original document used in generating the scan data is a printed matter on which an image is printed. Thus, at the level of dots constituting an image, halftone dots are formed in a uniform portion such as the background Bg2 having a color different from white in the original document. An area of the halftone dots in the printed matter includes a plurality of dots and portions having no dot (portions representing the base color of the document). Therefore, at the pixel level, halftone dots are formed in an area representing the background Bg2 in the scan image SI. The halftone dots are arranged with periodicity due to influence of a dither matrix used in printing of the document. Accordingly, when printing is performed using the scan data, moire is more likely to appear due to interference between the periodic component of the halftone dot pattern existing in the original image (scan image SI) before the halftone process is performed and the periodic component of the dot pattern constituting a printing image. In the processed image of the present example, the periodic component of the dot pattern constituting a portion different from the edge in the original image (scan image SI) is reduced by the smoothing process. As a result, when the processed image is to be printed using the processed image data, problems such as moire can be suppressed from occurring in the processed image to be printed.

Further, the edge sharpening process is applied to the values of the plurality of edge pixels in the scan data (S40), and the halftone-dot smoothing process is applied to the plurality of pixels different from the plurality of edge pixels (S35). As a result, processed image data representing a processed image in which a portion not constituting the edge is smoothed, the boundary between black and white is appropriately clarified, and other edges (e.g., edges of the characters Ob4f and Ob7f having a color different from black) are emphasized can be generated.

A-3: Black Pixel Specifying Process

Figure 5:
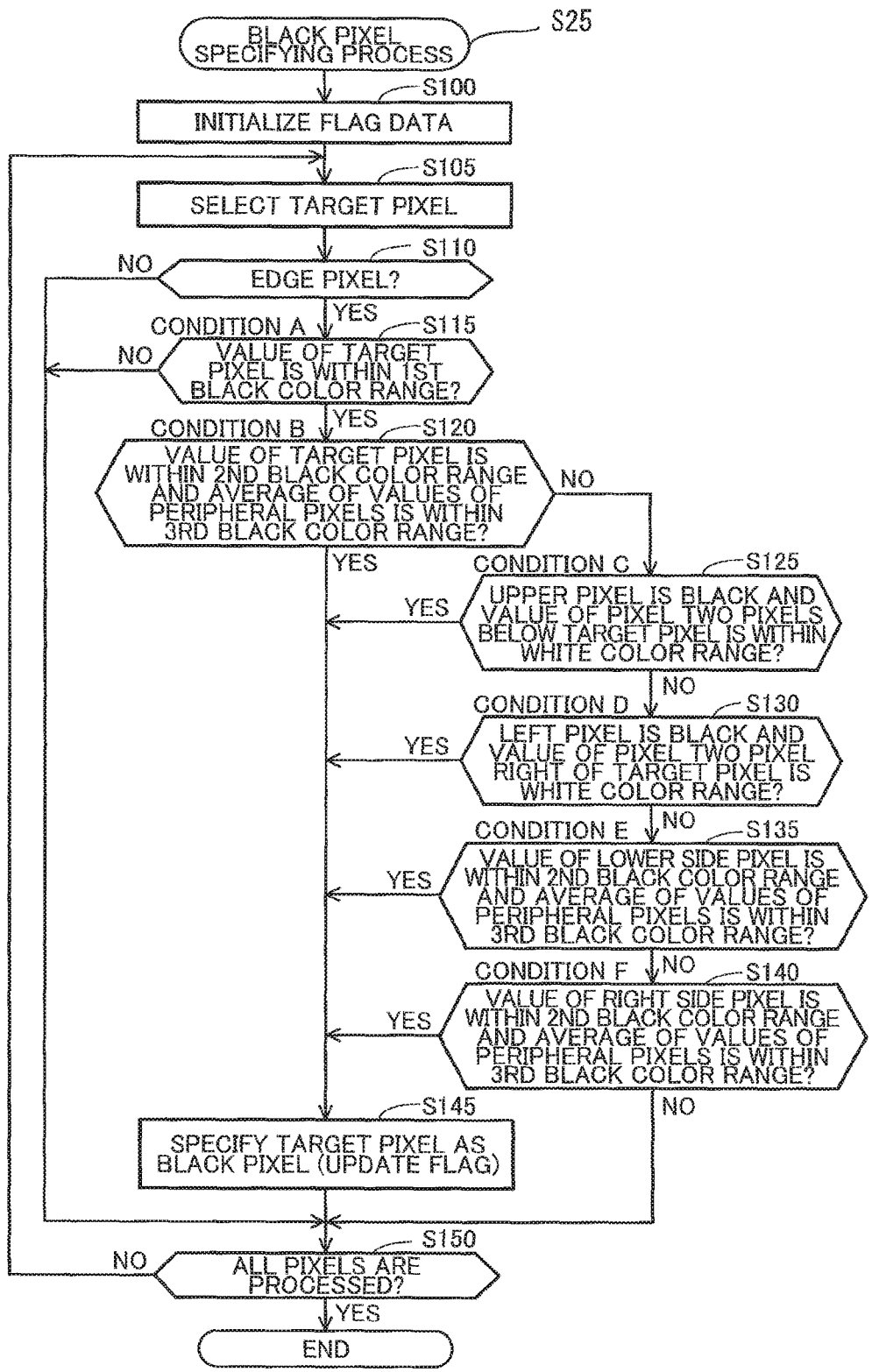
FIG. 5 is a flowchart illustrating a black pixel specifying process.

The black pixel specifying process of S25 in FIG. 2 will be described. FIG. 5 is a flowchart illustrating the black pixel specifying process. In S100, the CPU 210 initializes the flag data. A value of each of the plurality of flags in the initialized flag data has a default value, specifically, a value (in the present embodiment, "0") representing neither the black pixel nor white pixel.

In S105, the CPU 210 selects one target pixel from among the plurality of pixels in the scan image SI according to a prescribed processing order. Specifically, in the present embodiment, the pixels on a plurality of raster lines parallel to the first direction D1 of FIG. 3A are sequentially processed starting from the upstream side (upper side of FIG. 3A) to the downstream side (lower side) in the second direction D2. The plurality of pixels on one raster line are sequentially processed starting from the upstream side (left side of FIG. 3A) to the downstream side (right side) in the first direction D1. That is, among the plurality of pixels located on the same position in the first direction D1, a pixel on the upstream side in the second direction D2 is selected prior to a pixel on the downstream side, and among the plurality of pixels located on the same position in the second direction D2, a pixel on the upstream side in the first direction D1 is selected prior to a pixel on the downstream side. Each of the first direction D1 (direction from the left to right in FIG. 3A) and the second direction D2 (direction from the top to bottom) is referred to also as a "processing direction".

In S110, the CPU 210 determines whether the target pixel is the edge pixel or non-edge pixel. When the target pixel corresponds to a pixel specified as the edge pixel in the binary image data on which the expansion/contraction process of S20 (FIG. 2) has been performed, the CPU 210 determines that the target pixel is the edge pixel. On the other hand, when the target pixel corresponds to a pixel specified as the non-edge pixel in the binary image data, the CPU 210 determines that the target pixel is the non-edge pixel.

In the case where the target pixel is determined as the edge pixel (S110: YES), the CPU 210 proceeds to S115. In the case where the target pixel is determined as the non-edge pixel (S110: NO), the CPU 210 proceeds to S150.

In S115, the CPU 210 determines whether the value (RGB value) of the target pixel falls within a first black color range. The first black color range is a prescribed range of the RGB value including a black color, where the RGB component values (R, G, and B) satisfy the following expression (2).

$$R \leq TH1,\ G \leq TH1,\ \text{and}\ B \leq TH1 \tag{2}$$

The threshold TH1 is, e.g., 130 when each component value is a gradation value ranging from 0 to 255. When the value of the target pixel falls within the first black color range, the target pixel is estimated to have a color closer to black than to white. Hereinafter, a determination condition used in determination of S115, i.e., a condition for determining "value of the target pixel falls within the first black color range" is referred to as "determination condition A". The second color range has an RGB value which the black pixel should have (or is inferred to have). In other words, the determination condition A is a condition to determine whether a difference between the value of the target pixel and the pixel value of the black pixel falls within a prescribed range. For example, the RGB value which the black pixel should have is (0, 0, 0).

When the determination condition A is satisfied (S115: YES), the CPU 210 proceeds to S120. When the determination condition A is not satisfied (S115: NO), the CPU 210 proceeds to S150.

In S120, the CPU 210 determines whether the value of the target pixel falls within a second black color range and whether the average of the values of a plurality of pixels within a peripheral area falls within a third black color range. The second black color range is a prescribed range including a black color, and the second black color range is narrower than the first black color range. In other words, in S120, the CPU 210 determines whether a difference between the value of the target pixel and the value of the black pixel falls within a prescribed range. Specifically, the second black color range is a range of the RGB value where the RGB component values (R, G, and B) satisfy the following expression (3).

$$R \leq TH2,\ G \leq TH2,\ \text{and}\ B \leq TH2 \tag{3}$$

The threshold TH2 is a value smaller than the threshold TH1 and is, e.g., 100 when each component value is a gradation value ranging from 0 to 255. The second color range has an RGB value which the black pixel should have (or inferred to have). For example, the RGB value which the black pixel should have is (0, 0, 0).

In the present example, the peripheral area is a rectangular area of 5×5 pixels (horizontally arranged pixels×vertically arranged pixels) centered at the target pixel. The CPU 210 calculates the average (Rav, Gav, and Bav) of the RGB values of 25 pixels in the peripheral area. Assuming that the maximum value of the three component values (average values), Rav, Gav, and Bav, is MAXav, and the minimum value thereof is MINav, the average of the values of a plurality of pixels falls within the third black color range when a difference between the maximum value MAXav and the minimum value MINav satisfies the following expression (4).

$$(MAXav - MINav) \leq TH3 \tag{4}$$

The threshold TH3 is, e.g., 50. When the difference between the maximum and minimum of the average falls within the third black color range, each pixel within the peripheral area is estimated to have comparatively a low chroma color. Hereinafter, a determination condition used in determination of S120, i.e., a condition for determining "the value of the target pixel falls within the second black color range, and the average of the values of a plurality of pixels within the peripheral area falls within the third black color range" is referred to as "determination condition B".

When the determination condition B is satisfied (S120: YES), the CPU 210 proceeds to S145. When the determination condition B is not satisfied (S120: NO), the CPU 210 proceeds to S125.

In S125, the CPU 210 determines whether the pixel adjacent to (or in contact with) the upper side of the target pixel is the black pixel and whether the value of a pixel two pixels below the target pixel (a pixel below the target pixel by a gap of one pixel) falls within a white color range. When the flag corresponding to the pixel adjacent to the upper side of the target pixel has a value representing the black pixel, the upper adjacent pixel is determined to be the black pixel.

The white color range is a prescribed range including a white color. Specifically, the CPU 210 uses the component values (R, G, and B) of the pixel to calculate the luminance Y of the pixel two pixels below the target pixel according to the above described expression. A value of a pixel is within the white color range is met for the pixel when the luminance Y of the pixel satisfies the following expression (5).

$$Y \leq TH4 \tag{5}$$

The threshold TH4 is, e.g., 190 when each component value is a gradation value ranging from 0 to 255. When the value of the target pixel falls within the white color range, the target pixel is estimated to have a sufficient luminance close to the white color. Hereinafter, a determination condition used in determination of S125, i.e., a condition for determining "pixel adjacent to the upper side of the target pixel is the black pixel, and the value of a pixel two pixels below the target pixel falls within the white color range" is referred to as "determination condition C".

When the determination condition C is satisfied (S125: YES), the CPU 210 proceeds to S145. When the determination condition C is not satisfied (S125: NO), the CPU 210 proceeds to S130.

In S130, the CPU 210 determines whether the pixel adjacent to (in contact with) the left side of the target pixel is the black pixel and whether the value of a pixel two pixels to the right of the target pixel (a pixel located right side of the target pixel by a gap of one pixel) falls within the white color range. Whether the pixel adjacent to the left side of the target pixel is the black pixel is determined by referring to the flag data, as in S125. The white range used here is the same as that used in S125. Hereinafter, a determination condition used in determination of S130, i.e., a condition for determining "pixel adjacent to the left side of the target pixel is the black pixel, and the value of the pixel two pixels to the right of the target pixel falls within the white color range" is referred to as "determination condition D".

When the determination condition D is satisfied (S130: YES), the CPU 210 proceeds to S145. When the determination condition D is not satisfied (S130: NO), the CPU 210 proceeds to S135.

In S135, the CPU 210 determines whether the value of the pixel adjacent to (or in contact with) the lower side of the target pixel falls within the second black color range and whether an average of values of a plurality of pixels within a peripheral area around the pixel adjacent to the lower side of the target pixel falls within the third black color range. The second black color range satisfies the above expression (3). The peripheral area is a rectangular area of 5×5 pixels (horizontally arranged pixels×vertically arranged pixels) centered at the pixel adjacent to the lower side of the target pixel similarly to the above-described peripheral area around the target pixel. The third black color range satisfies the above expression (4). Hereinafter, a determination condition used in determination of S135, i.e., a condition for determining "value of the pixel adjacent to the lower side of the target pixel falls within the second black color range, and the average of the values of the plurality of pixels within the peripheral area around the pixel adjacent to the lower side of the target pixel falls within the third black color range" is referred to as "determination condition E".

When the determination condition E is satisfied (S135: YES), the CPU 210 proceeds to S145. When the determination condition E is not satisfied (S135: NO), the CPU 210 proceeds to S140.

In S140, the CPU 210 determines whether the value of the pixel adjacent to (or in contact with) the right side of the target pixel falls within the second black color range and whether an average of values of a plurality of pixels within a peripheral area around the pixel adjacent to the right side of the target pixel falls within the third black color range. The second black color range satisfies the above expression (3). The peripheral area is a rectangular area of 5×5 pixels (horizontally arranged pixels×vertically arranged pixels) centered at the pixel adjacent to the right side of the target pixel similarly to the above-described peripheral area around the target pixel. The third black color range satisfies the above expression (4). Hereinafter, a determination condition used in determination of S140, i.e., a condition for determining "value of the pixel adjacent to the right side of the target pixel falls within the second black color range, and the average of the values of the plurality of pixels within the peripheral area around the pixel adjacent to the right side of the target pixel falls within the third black color range" is referred to as "determination condition F".

When the determination condition F is satisfied (S140: YES), the CPU 210 proceeds to S145. When the determination condition F is not satisfied (S140: NO), the CPU 210 proceeds to S150.

In S145, the CPU 210 specifies the target pixel as the black pixel. In this case, in the flag data, the value of the flag corresponding to the target pixel is updated to a value (in the present example, "1") representing the black pixel.

In S150, the CPU 210 determines whether all the pixels in the scan image SI have been processed as the target pixel. When there is a unprocessed pixel (S150: NO), the CPU 210 returns to S105 and selects the unprocessed pixel as the target pixel. When all the pixels have been processed (S150: YES), the CPU 210 ends the black pixel specifying process.

As can be seen from the above description, when in the black pixel specifying process the target pixel is specified as the edge pixel in the binary image data on which the expansion/contraction process has been performed (S110: YES), the target pixel is subjected to determination with respect to at least one of the determination conditions A-F. In the following cases (1)-(5) regarding the determination conditions A-F, the target pixel is specified as the black pixel:

(1) A case where at least the determination condition B is satisfied; (2) A case where at least both the determination conditions A and C are satisfied; (3) A case where at least both the determination conditions A and D are satisfied; (4) A case where at least both the determination conditions A and E are satisfied; and (5) A case where at least both the determination conditions A and F are satisfied.

Because the second black color range is narrower than the first black color range, the determination condition A is certainly satisfied when the determination condition B is satisfied. Further, when the determination condition A is not satisfied, the determination condition B is also not satisfied. Accordingly, in a case where the determination condition A is not satisfied, such case does not falls under the cases (1)-(5).

Figure 6A:
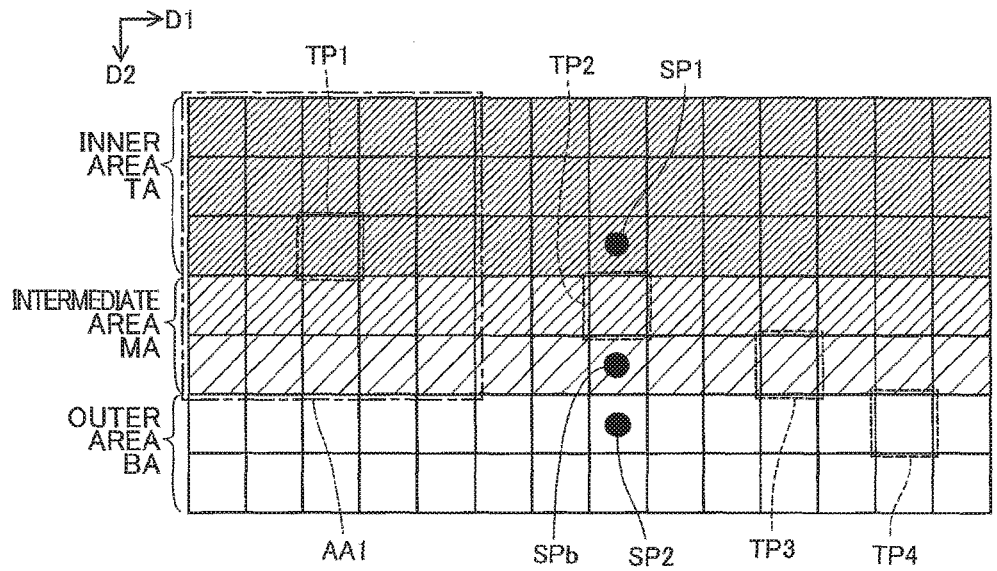
Figure 6B:
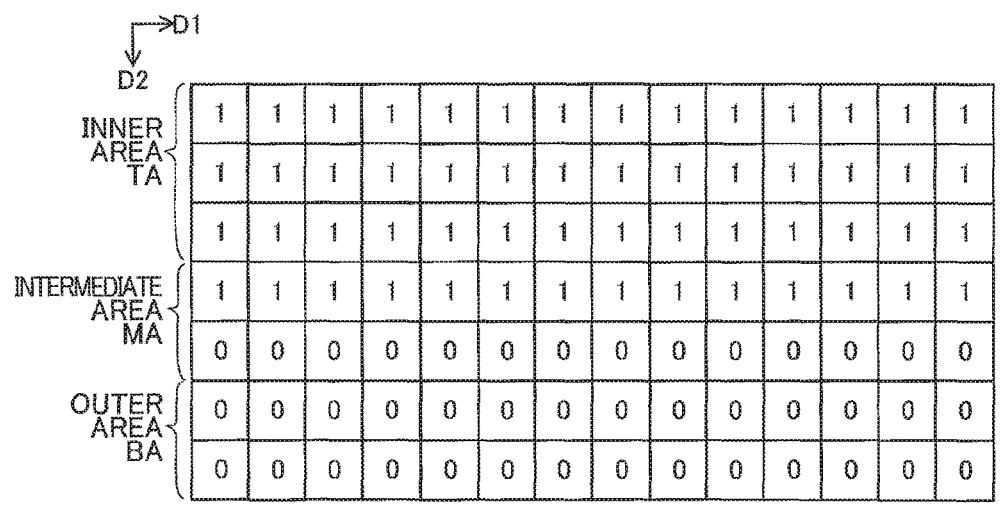

Hereinafter, concrete examples will be described. FIGS. 6A and 6B are first explanatory views of the black pixel specifying process. FIG. 6A illustrates an enlarged view of an edge (referred to also as "lower edge") at the lower side of a horizontal line (extending in the first direction D1) constituting a black character (e.g., the character Ob6 in FIG. 3A) on a white background in the scan image SI. An area in the vicinity of the lower edge includes an inner area TA, an outer area BA, and an intermediate area MA. The inner area TA is the black character side area. The outer area BA is the white background side area. The intermediate area MA is the area between the inner area TA and the outer area BA. Each pixel in the inner area TA has a color close to black. Each pixel in the outer area BA has a color close to white. Each pixel in the intermediate area MA has an intermediate color between black and white, that is, the intermediate area MA represents so-called "blurring". A plurality of pixels in the areas TA, BA, and MA are specified as the edge pixel in the expansion-processed binary image data. Thus, when any one of the plurality of pixels in the areas TA, BA, and MA is selected as the target pixel, the selected target pixel is determined as the edge pixel in S110 (S110: YES).

A pixel TP1 in the inner area TA has a color close to black in the target image data. Each of a plurality of pixels in a peripheral range AA1 around the pixel TP1 is located in the vicinity of the edge between black and white and thus has low chroma. Thus, when the pixel TP1 is selected as the target pixel, the value of the pixel TP1 is determined to fall within the first black color range (S115: YES). Then, the value of the pixel TP1 is determined to fall within the second black color range, and the average of the values of the plurality of pixels in the peripheral range AA1 is determined to fall within the third black color range (S120: YES). Thus, the pixel TP1 satisfies the above determination condition B, and thus the pixel TP1 is specified as the black pixel (S145).

A pixel TP2 in the intermediate area MA located closer to the inner area TA than to the outer area BA has a color closer to black than to white in the target image data, but the color of the pixel TP2 is not closer to black than the color of a pixel in the inner area TA is. Thus, when the pixel TP2 is selected as the target pixel, the value of the pixel TP2 is determined to fall within the first black color range (S115: YES), but determined not to fall within the second black color range (S120: NO). That is, the pixel TP2 satisfies the determination condition A, but does not satisfy the determination condition B.

A pixel SP1 adjacent to the upper side of the pixel TP2 is located in the inner area TA. The pixel SP1 is selected as the target pixel and specified as the black pixel before the pixel TP2 is selected as the target pixel. A pixel SP2 two pixels below the pixel TP2 is located in the outer area BA. The pixel SP2 in the outer area BA has a color close to white. Thus, a pixel adjacent to the upper side of the pixel SP2 is determined to be the black pixel, and the value of the pixel two pixels below the target pixel is determined to fall within the white color range (S125: YES). Thus, the pixel TP2 satisfies both the determination conditions A and C, and thus the pixel TP2 is specified as the black pixel (S145).

A pixel TP3 in the intermediate area MA located closer to the outer area BA than to the inner area TA has a color closer to white than to black. Thus, when the pixel TP3 is selected as the target pixel, the value of the pixel TP3 in the target image data is determined to not fall within the first black color range (S115: NO). Thus, the pixel TP3 does not satisfy the determination condition A, and thus the pixel TP3 is not specified as the black pixel.

A pixel TP4 in the outer area BA has a color approximate to white. Thus, when the pixel TP4 is selected as the target pixel, the value of the pixel TP4 is determined not to fall within the first black color range (S115: NO). Thus, the pixel TP4 does not satisfy the above determination condition A, and thus the pixel TP4 is not specified as the black pixel.

FIG. 6B illustrates the flag data corresponding to the area in the scan image SI illustrated in FIG. 6A. The illustrated flag data is obtained at the time point when the black pixel specifying process is ended. As illustrated in FIG. 6B, in the vicinity of the lower edge, pixels (e.g., the pixel TP1) in the inner area TA and pixels (e.g., the pixel TP2) in the intermediate area MA that are located closer to the inner area TA than to the outer area BA are specified as the black pixel by the black pixel specifying process. On the other hand, pixels (e.g., the pixel TP3) in the intermediate area MA that are located closer to the outer area BA than to the inner area TA and pixels (e.g., the pixel TP4) in the outer area BA are not specified as the black pixel.

FIGS. 7A and 7B are second explanatory views of the black pixel specifying process. FIG. 7A illustrates an enlarged view of an edge (referred to also as "right edge") at the right side of a vertical line (extending in the second direction D2) constituting a black character in the scan image SI. An area in the vicinity of the right edge includes the inner area TA, the outer area BA, and the intermediate area MA like the lower edge of FIG. 6A. When each of the plurality of pixels in the areas TA, BA, and MA is selected as the target pixel, the selected target pixel is determined as the edge pixel in S110 (S110: YES).

A pixel TP5 in the inner area TA has a color approximate to black. Each of a plurality of pixels in a peripheral range AA2 around the pixel TP5 is located in the vicinity of the edge between black and white, and thus has color having low chroma. Thus, similarly to the pixel TP1 of FIG. 6A, the pixel TP5 satisfies the above determination condition B (S115: YES and S120: YES), and thus the pixel TP5 is specified as the black pixel (S145).

A pixel TP6 in the intermediate area MA located closer to the inner area TA than to the outer area BA has a color closer to black than to white, but the color of the pixel TP6 is not closer to black than the color of a pixel in the inner area TA is. Thus, similarly to the pixel TP2 of FIG. 6A, the pixel TP6 satisfies the determination condition A (S115: YES) but does not satisfy the determination condition B (S120: NO).

A pixel SP3 adjacent to the upper side of the pixel TP6 in the intermediate area MA is located closer to the inner area TA than to the outer area BA. Thus, the pixel SP3 is selected as the target pixel and specified as the black pixel before the pixel TP6 is selected as the target pixel. A pixel SP4 two pixels below the pixel TP6 in the intermediate area MA is located closer to the inner area TA than to the outer area BA. Thus, the pixel SP4 has a color not close to white. Thus, the pixel TP6 is determined not to satisfy the determination condition C (S125: NO).

A pixel SP5 adjacent to the left side of the pixel TP6 is located in the inner area TA. The pixel SP5 is selected as the target pixel and specified as the black pixel before the pixel TP6 is selected as the target pixel. A pixel SP6 two pixels to the right of the pixel TP6 is located in the outer area BA. The pixel SP6 in the outer area BA has a color close to white. Thus, the pixel TP6 is determined to satisfy the determination condition D (S130: YES). Thus, the pixel TP6 satisfies both the determination conditions A and D, and thus the pixel TP6 is specified as the black pixel (S145).

A pixel TP7 in the intermediate area MA located closer to the outer area BA than to the inner area TA has a color closer to white than to black. A pixel TP8 in the outer area BA has a color close to white. Thus, similarly to the pixels TP3 and TP4 of FIG. 6A, the pixels TP7 and TP8 do not satisfy the determination condition A (S115: NO), and thus the pixels TP7 and TP8 are not specified as the black pixel.

FIG. 7B illustrates the flag data corresponding to the area in the scan image SI illustrated in FIG. 7A. The illustrated flag data is obtained at the time point when the black pixel specifying process is ended. As illustrated in FIG. 7B, in the vicinity of the right edge, pixels (e.g., pixel TP5) in the inner area TA and pixels (e.g., pixel TP6) in the intermediate area MA that are located closer to the inner area TA than to the outer area BA are specified as the black pixel by the black pixel specifying process in the same manner as in the vicinity of the lower edge. On the other hand, pixels (e.g., pixel TP7) in the intermediate area MA that are located closer to the outer area BA than to the inner area TA and pixels (e.g., pixel TP8) in the outer area BA are not specified as the black pixel.

Figure 8A:
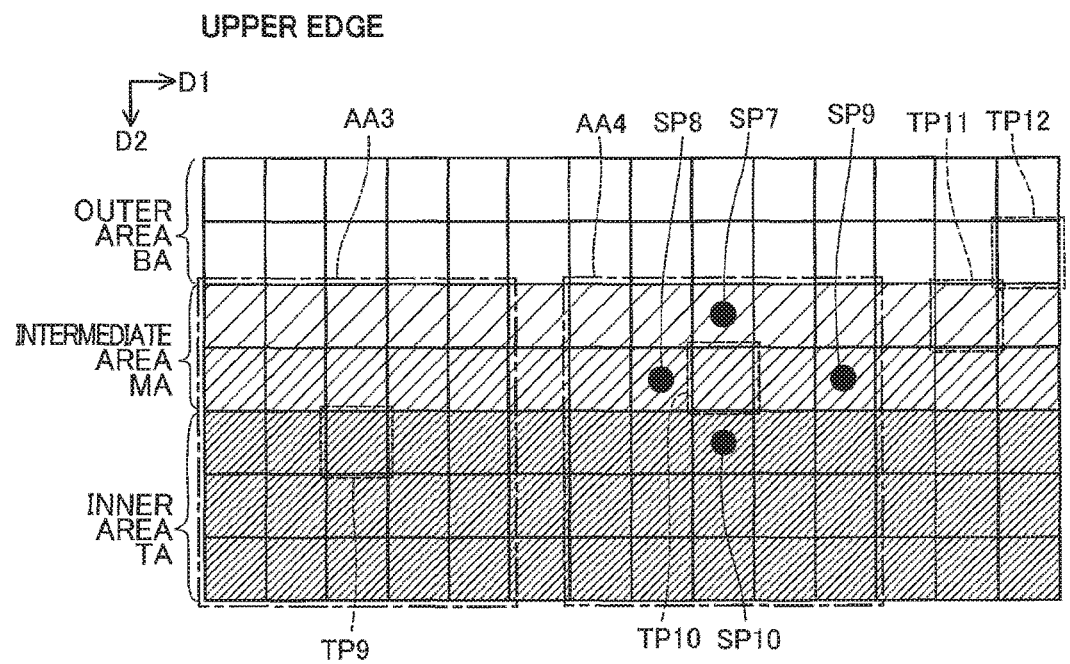
Figure 8B:
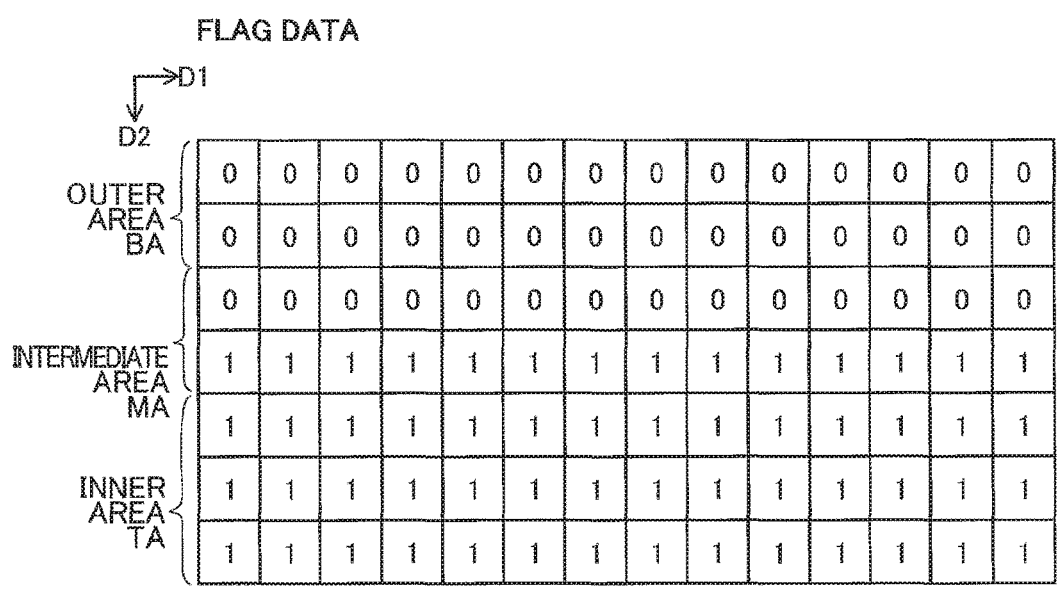

FIGS. 8A and 8B are third explanatory views of the black pixel specifying process. FIG. 8A illustrates an enlarged view of an edge (referred to also as "upper edge") at the upper side of a horizontal line (extending in the first direction D1) constituting a black character in the scan image SI. An area in the vicinity of the upper edge includes the inner area TA, the outer area BA, and the intermediate area MA similarly to the lower edge of FIG. 6A. When each of the plurality of pixels in the areas TA, BA, and MA is selected as the target pixel, the selected target pixel is determined as the edge pixel in S110 (S110: YES).

A pixel TP9 in the inner area TA has a color approximate to black in the target image data. Each of a plurality of pixels in a peripheral range AA3 around the pixel TP9 is located in the vicinity of the edge between black and white and thus has a color having low chroma. Thus, similarly to the pixel TP1 of FIG. 6A, the pixel TP9 satisfies the above determination condition B (S115: YES and S120: YES), and thus the pixel TP9 is specified as the black pixel (S145).

A pixel TP10 in the intermediate area MA located closer to the inner area TA than to the outer area BA has a color closer to black than to white, but the color of the pixel TP10 is not closer to black than the color of a pixel in the inner area TA is. Thus, similarly to the pixel TP2 of FIG. 6A, the pixel TP10 satisfies the determination condition A (S115: YES) but does not satisfy the determination condition B (S120: NO).

A pixel SP7 adjacent to the upper side of the pixel TP10 in the intermediate area MA is located closer to the outer area BA than to the inner area TA. Thus, the pixel SP7 is selected as the target pixel but not specified as the black pixel before the pixel TP10 is selected as the target pixel. Thus, the pixel TP10 is determined not to satisfy the determination condition C (S125: NO).

A pixel SP8 adjacent to the left side of the pixel TP10 in the intermediate area MA is located closer to the inner area TA than to the outer area BA. Thus, the pixel SP8 is selected as the target pixel and specified as the black pixel before the pixel TP10 is selected as the target pixel. A pixel SP9 two pixels to the right of the pixel TP10 in the intermediate area MA is located closer to the inner area TA than to the outer area BA. Thus, the pixel SP9 has a color not close to white. Thus, the pixel TP10 is determined not to satisfy the determination condition D (S130: NO).

A pixel SP10 adjacent to the lower side of the pixel TP10 is located in the inner area TA. Thus, the pixel SP10 has a color approximate to black. Further, each of a plurality of pixels in a peripheral range AA4 around the pixel TP10 is located in the vicinity of the edge between black and white and thus has a color having low chroma. Thus, the pixel TP10 is determined to satisfy the determination condition E (S135: YES). As a result, the pixel TP10 satisfies both the determination conditions A and E, and thus the pixel TP10 is specified as the black pixel (S145).

A pixel TP11 in the intermediate area MA located closer to the outer area BA than to the inner area TA has a color closer to white than to black. A pixel TP12 in the outer area BA has a color approximate to white. Thus, similarly to the pixels TP3 and TP4 of FIG. 6A, the values of the pixels TP11 and TP12 do not satisfy the determination condition A (S115: NO), and thus the pixels TP11 and TP12 are not specified as the black pixel.

FIG. 8B illustrates the flag data corresponding to the area in the scan image SI illustrated in FIG. 8A. The illustrated flag data is obtained at the time point when the black pixel specifying process is ended. As illustrated in FIG. 8B, in the vicinity of the upper edge, pixels (e.g., pixel TP9) in the inner area TA and pixels (e.g., pixel TP10) in the intermediate area MA, which are located closer to the inner area TA than to the outer area BA, are specified as the black pixel by the black pixel specifying process in the same manner as in the vicinity of the lower edge. On the other hand, pixels (e.g., pixel TP11) in the intermediate area MA that are located closer to the outer area BA than to the inner area TA and pixels (e.g., pixel TP12) in the outer area BA are not specified as the black pixel.

FIGS. 9A and 9B are fourth explanatory views of the black pixel specifying process. FIG. 9A illustrates an enlarged view of an edge (referred to also as "left edge") at the left side of a vertical line (extending in the second direction D2) constituting a black character in the scan image SI. An area in the vicinity of the left edge includes the inner area TA, the outer area BA, and the intermediate area MA similarly to the lower edge of FIG. 6A. When each of the plurality of pixels in the areas TA, BA, and MA is selected as the target pixel, the selected target pixel is determined as the edge pixel in S110 (S110: YES).

A pixel TP13 in the inner area TA has a color approximate to black. Each of a plurality of pixels in a peripheral range AA5 around the pixel TP13 is located in the vicinity of the edge between black and white, and thus has a color having low chroma. Thus, similarly to the pixel TP1 of FIG. 6A, the pixel TP13 satisfies the above determination condition B (S115: YES and S120: YES), and thus the pixel TP13 is specified as the black pixel (S145).

A pixel TP14 in the intermediate area MA located closer to the inner area TA than to the outer area BA has a color closer to black than to white but not closer to black than the color of a pixel in the inner area TA is. Thus, similarly to the pixel TP2 of FIG. 6A, the pixel TP14 satisfies the determination condition A (S115: YES) but does not satisfy the determination condition B (S120: NO).

A pixel SP11 adjacent to the upper side of the pixel TP14 in the intermediate area MA is located closer to the inner area TA than to the outer area BA. Thus, the pixel SP11 is selected as the target pixel and specified as the black pixel before the pixel TP14 is selected as the target pixel. A pixel SP12 two pixels below the pixel TP14 in the intermediate area MA is located closer to the inner area TA than to the outer area BA. Thus, the pixel SP12 has a color not approximate to white. Thus, the pixel TP14 is determined not to satisfy the determination condition C (S125: NO).

A pixel SP13 adjacent to the left side of the pixel TP14 in the intermediate area MA is located closer to the outer area BA than to the inner area TA. Thus, the pixel SP13 is selected as the target pixel but not specified as the black pixel before the pixel TP14 is selected as the target pixel. Thus, the pixel TP14 is determined not to satisfy the determination condition D (S130: NO).

A pixel SP14 adjacent to the lower side of the pixel TP14 in the intermediate area MA is located closer to the inner area TA than to the outer area BA. Thus, the pixel SP14 has a color closer to black than to white but not closer to black than the color of a pixel in the inner area TA is. Thus, the pixel TP14 is determined not to satisfy the determination condition E (S135: NO).

A pixel SP15 adjacent to the right side of the pixel TP14 is located in the inner area TA. Thus, the pixel SP15 has a color approximate to black. Further, each of a plurality of pixels in a peripheral range AA6 around the pixel SP15 is located in the vicinity of the edge between black and white and thus has a color having low chroma. Accordingly, the pixel TP14 is determined to satisfy the determination condition F (S140: YES). As a result, the pixel TP14 satisfies both the determination conditions A and F, and thus the pixel TP14 is specified as the black pixel (S145).

FIG. 9B illustrates the flag data corresponding to the area in the scan image SI illustrated in FIG. 9A. The illustrated flag data is obtained at the time point when the black pixel specifying process is ended. As illustrated in FIG. 9B, in the vicinity of the left edge, pixels (e.g., pixel TP13) in the inner area TA and pixels (e.g., pixel TP14) in the intermediate area MA that are located closer to the inner area TA than to the outer area BA are specified as the black pixel by the black pixel specifying process in the same manner as in the vicinity of the lower edge. On the other hand, pixels (e.g., pixel TP15) in the intermediate area MA that are located closer to the outer area BA than to the inner area TA and pixels (e.g., pixel TP16) in the outer area BA are not specified as the black pixel.

As can be seen from the description using FIGS. 6A-9B, in the black character on the white background, the pixels in the inner area TA and the pixels in the intermediate area MA that are located closer to the inner area TA than to the outer area BA fall under at least one of the above cases (1) to (5), and are thus specified as the black pixel. On the other hand, the pixels in the outer area BA and pixels in the intermediate area MA that area located closer to the outer area BA than to the inner area TA fall under none of the above cases (1) to (5), and are thus not specified as the black pixel. As a result, the black pixels are appropriately specified. Each pixel in the vicinity of the edge of a character having a color other than black does not have a value falling within the first and second black color ranges, that is, satisfies neither the determination conditions A nor B, and thus is not specified as the black pixel. For each pixel in the vicinity of the edge of a black character on a background having a color other than white, such pixel is not specified as the black pixel. This is because chroma of the average of the values of pixels in a peripheral area of this pixel is comparatively high, or the color of the pixel separated outward by two pixels from this pixel is not approximate to white.

According to the above described black pixel specifying process of FIG. 5, a pixel A (e.g., pixels SP5 and SP13) is selected as the target pixel prior to a pixel B (e.g., pixels TP6 and TP14) and a pixel C (e.g., pixels SPa and SP15), as explained in the processes for the pixels SP5, TP6, and SPa (FIG. 7A) arranged in the first direction D1 and the processes for the pixels SP13, TP14, and SP15 (FIG. 9A) arranged in the first direction D1. Here, the pixel B is adjacent to the pixel A in the first direction D1, and the pixel C (e.g., pixels SPa and SP15) is adjacent to the pixel B in the first direction D1. The CPU 210 first determines whether the pixel A (e.g., pixels SP5 and SP13) is the black pixel (S110 to S145). Subsequently, when selecting the pixel B (e.g., pixels TP6 and TP14) as the target pixel, the CPU 210 determines whether the determination condition D is satisfied (S130). Here, the determination condition D includes a condition that the pixel A is specified as the black pixel. When the determination condition D is satisfied (S130: YES, FIG. 7A), the CPU 210 specifies the pixel B (e.g., pixel TP6) as the black pixel (S145, FIG. 7A). When the determination condition D is not satisfied (S130: NO), the CPU 210 determines whether the determination condition F is satisfied (S140). Here, the determination condition F includes a condition that the value of the pixel C (e.g., pixel SP15) falls within the second black color range. When the determination condition F is satisfied (S140: YES), the CPU 210 specifies the pixel B (e.g., pixel TP14) as the black pixel (S145). As a result, when the determination condition D is satisfied, the pixel B can be specified as the black pixel irrespective of whether the determination condition F is satisfied. As a result, when the pixel A is specified as the black pixel, the pixel B can be specified as the black pixel efficiently on the basis of determination of the pixel A as the black pixel. In other words, when the pixel B (pixel TP6) can be specified as the black pixel using a determination result indicating whether the pixel A (e.g., SP5) is the black pixel, the pixel B can be specified as the black pixel without determining any condition for undetermined pixel C (e.g., pixel SPa). Thus, the pixel B can be specified as the black pixel efficiently.

Similarly, a pixel D (e.g., pixel SP1 or SP7) is selected as the target pixel prior to a pixel E (e.g., pixel TP2 or TP10) and a pixel F (e.g., pixel SPb or SP10), as explained in the processes for the pixels SP1, TP2, and Spb (FIG. 6A) arranged in the second direction D2 and the processes for the pixels SP7, TP10, and SP10 (FIG. 8A) arranged in the second direction D2. Here, the pixel E is adjacent to the pixel D in the second direction D2 and the pixel F is adjacent to the pixel E in the second direction D2 The CPU 210 first determines whether the pixel D (e.g., pixels SP1 and SP7) is the black pixel (S110 to S145). Subsequently, when selecting the pixel E (e.g., pixels TP2 and TP10) as the target pixel, the CPU 210 determines whether the determination condition C is satisfied (S125). Here the determination condition C includes a condition that the pixel D is specified as the black pixel. When the determination condition C is satisfied (S125: YES, FIG. 6A), the CPU 210 specifies the pixel E (e.g., pixel TP2) as the black pixel (S145, FIG. 6A). When the determination condition C is not satisfied (S125: NO), the CPU 210 determines whether the determination condition E is satisfied (S135). Here, the determination condition E includes a condition that the value of the pixel F (e.g., pixel SP10) falls within the second black color range. When the determination condition E is satisfied (S135: YES), the CPU 210 specifies the pixel E (e.g., pixel TP10) as the black pixel (S145). As a result, when the determination condition C is satisfied, the pixel E can be specified as the black pixel irrespective of whether the determination condition E is satisfied. As a result, when the pixel D is specified as the black pixel, the pixel E can be specified as the black pixel efficiently on the basis of determination of the pixel D specified as the black pixel. In other words, when the pixel E (pixel TP2) can be specified as the black pixel using a determination result indicating whether the pixel D (e.g., SP1) is the black pixel, the pixel E can be specified as the black pixel without determining any condition for undetermined pixel F (e.g., pixel SPb). Thus, the pixel E can be specified as the black pixel efficiently.

Further, according to the black pixel specifying process, the CPU 210 selects each of the plurality of edge pixels as the target pixel and determines whether the determination condition A is satisfied (S115 of FIG. 5). Here, the determination condition A includes a condition that the value of the target pixel falls within the first black color range. When the determination condition A is satisfied (S115: YES), the CPU 210 determines whether at least one of the determination conditions B-F is satisfied (S120 to S140). Here, each of the conditions B-F includes a condition based on the value of the peripheral pixel such as pixels within the peripheral area. When at least one of the determination conditions B-F is satisfied (one of S120-S140: YES), the CPU 210 specifies the target pixel as the black pixel (S145). When the determination condition A is not satisfied (S115: NO), the CPU 210 does not determine any of the determination conditions B-F. This is because the target pixel should not be specified as the black pixel when the determination condition A is not satisfied, that is, when the value of the target pixel does not fall within the first black color range. Thus, as described above, when the determination condition A determined prior to the other determination conditions B-F is not satisfied, the target pixel is not specified as the black pixel without determining any of the determination conditions B to F. This allows the black pixel to be specified efficiently.

A-4: White Pixel Specifying Process

The white pixel specifying process of S30 in FIG. 2 will be described. FIG. 10 is a flowchart illustrating the white pixel specifying process. In S200, the CPU 210 sets the number M of pixels to be checked (hereinafter, simply referred to as the number M) depending on reading resolutions (dpi (dot per inch)) of the scan data in the first direction D1 and the second direction D2. The number M indicates the number of pixels adjacent to the target pixel in a check direction, for which it is checked whether the pixels are specified as the white pixel and is a natural number equal to or larger than 1. In the present example, the CPU 210 sets the number M1 of pixels to be checked depending on the reading resolution in the first direction D1 and the number M2 of pixels to be checked depending on the reading resolution in the second direction D2. The higher the reading resolution is, the larger the number M becomes. For example, assuming that the reading resolution is R (dpi), the number M is set to a value obtained by rounding a value (R/300) down to the nearest decimal. For example, the number M is set to "2" when the reading resolution is 600 dpi and set to "4" when the reading resolution is 1200 dpi.

In S205, the CPU 210 selects one target pixel from among the plurality of pixels in the scan image SI In S210, the CPU 210 refers to the flag data generated in the black pixel specifying process to determine whether the target pixel is the black pixel. When the target pixel is a pixel that has been specified as the black pixel in the black pixel specifying process, the target pixel is determined to be the black pixel; when the target pixel is a pixel that has not been specified as the black pixel, the target pixel is determined not to be the black pixel.

When the target pixel is the black pixel (S210: YES), the CPU 210 proceeds to S215. When the target pixel is not the black pixel (S210: NO), the CPU 210 proceeds to S260.

In S215, the CPU 210 selects one check direction from among four directions including an upward direction, a downward direction, a leftward direction, and a rightward direction. In S230, the CPU 210 determines whether a pixel apart by "M−1"-number of pixels from the target pixel in the selected check direction (hereinafter, referred to as an M−1 apart pixel), is the black pixel. That is, "M−1"-number of pixels are interposed between the target pixel and the M−1 part pixel. In other words, the M−1 apart pixel is within a prescribed range from the target pixel, more specifically is separated from the target pixel by a prescribed distance. This is determined by referring to the flag data generated in the black pixel specifying process as in S210. More specifically, this determination is made by determining whether a value of a pixel in the flag data corresponding to the M−1 apart pixel has a value "1".

Figure 11A:
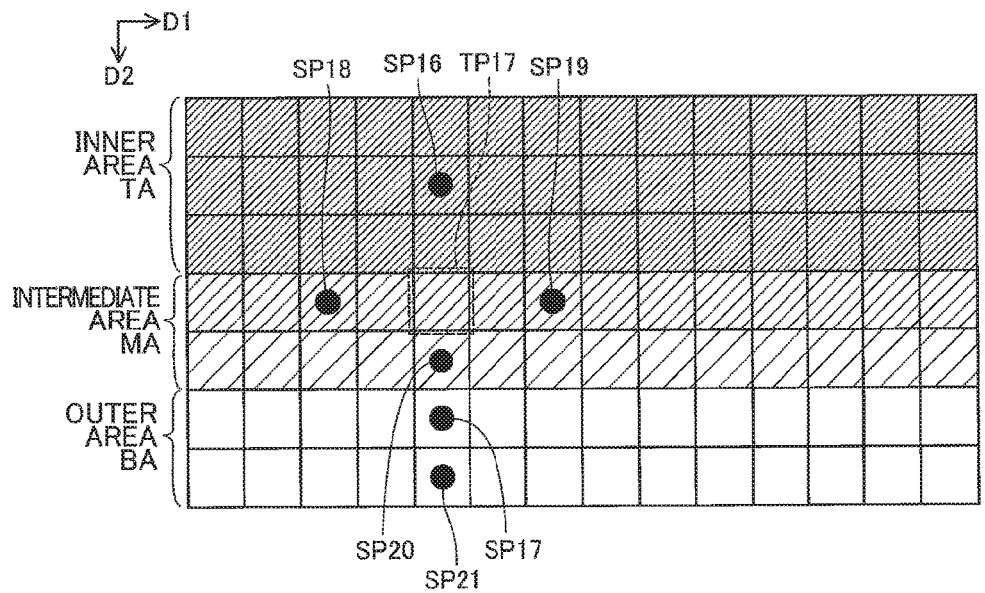
Figure 11B:
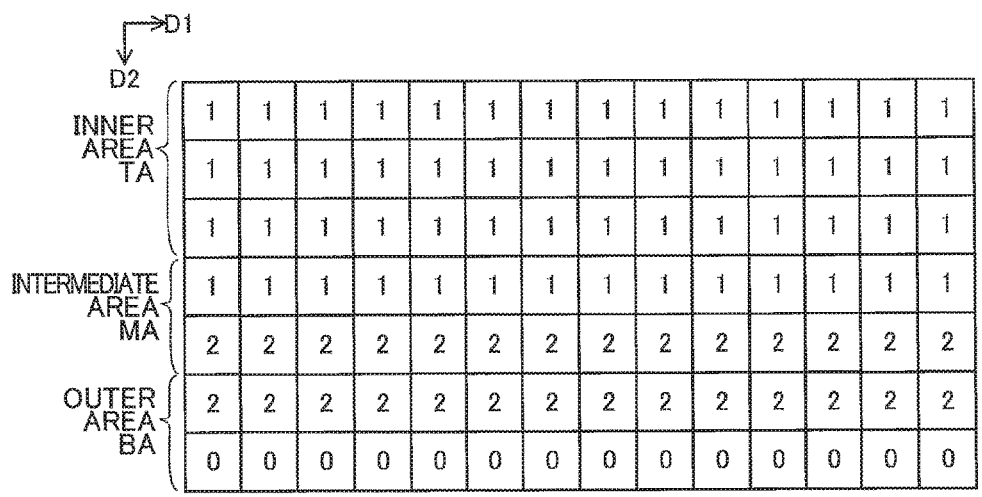

FIGS. 11A and 11B are first explanatory views of the white pixel specifying process. FIG. 11A illustrates an enlarged view of the lower edge similarly to FIG. 6A. FIG. 11B illustrates the flag data corresponding to the area in the scan image SI illustrated in FIG. 11A. The illustrated flag data is obtained at the time point when the white pixel specifying process is ended.

When the check direction is the leftward direction (opposite direction to the first direction D1) or the rightward direction (first direction D1) in FIG. 11A, the number M is the number M1 of pixels to be checked in the first direction D1. When the check direction is the upward direction (opposite direction to the second direction D2) or the downward direction (second direction D2) in FIG. 11A, the number M is the number M2 of pixels to be checked in the second direction D2. In the example of FIG. 11A, both the numbers M1 and M2 are set to "2".

When a pixel TP17 is selected as the target pixel, and the check direction is the upward direction, it is determined whether a pixel SP16 is the black pixel. Similarly, when the pixel TP17 is selected as the target pixel, and the check direction is set to any one of the downward direction, the leftward direction, and the rightward direction, it is determined whether corresponding one of pixels SP17, SP18, and SP19 is the black pixel. In the example of FIG. 11A, when the pixel TP17 is selected as the target pixel, and the check direction is set to any one of the upward direction, the leftward direction, and the rightward direction, corresponding one of the pixels SP16, SP18, and SP19, which is "M−1" apart pixels (one pixel in the example of FIG. 11A) apart from the target pixel in the checking direction, is determined to be the black pixel. When the pixel TP17 is selected as the target pixel, and the check direction is the downward direction, the pixel SP17 as the M−1 apart pixel is determined not to be the black pixel.

When the M−1 apart pixel is the black pixel (S230: YES), the CPU 210 proceeds to S255. When the M−1 apart pixel is not the black pixel (S230: NO), the CPU 210 proceeds to S235.

In S235, the CPU 210 determines whether the value of the M−1 apart pixel falls within the white color range. The white color range satisfies the above expression (5). The pixel SP17 (FIG. 11A) is located in the outer area BA and thus has a color approximate to white. Thus, when the pixel SP17 of FIG. 11A is the M−1 apart pixel of the target pixel, the value of the pixel SP17 is determined to fall within the white color range.

When the value of the M−1 apart pixel falls within the white color range (S235: YES), the CPU 210 proceeds to S240. When the value of the M−1 apart pixel does not fall within the white color range (S235: NO), the CPU 210 proceeds to S255.

In S240, the CPU 210 specifies the M−1 apart pixel as the white pixel. In this case, the CPU 210 updates the value of the flag corresponding to the M−1 apart pixel to a value ("2" in the present example) representing the white pixel. When the M−1 apart pixel is the pixel SP17 of FIG. 11A, the pixel SP17 is specified as the white pixel.

In S245, the CPU 210 determines whether there is any pixel different from the black pixel between the target pixel and the M−1 apart pixel from the target pixel. When the target pixel is the pixel TP17 of FIG. 11A, and the M−1 apart pixel is the pixel SP17, there is one pixel SP20 between the pixel TP17 and the pixel SP17. The pixel SP20 is not specified as the black pixel (FIG. 11B), and thus it is determined that there exists the pixel different from the black pixel. If the number M of pixels to be checked is "4", there exist three pixels between the target pixel and the pixel apart by three pixels from the target pixel. Generally, there exist "M−1"-number of pixels arranged in the check direction between the target pixel and the M−1 apart pixel. In this step, it is determined whether there is at least one pixel different from the black pixel among the "M−1"-number of pixels.

When there is any pixel different from the black pixel between the target pixel and the M−1 apart pixel (S245: YES), the CPU 210 proceeds to S250. When there is no pixel different from the black pixel between the target pixel and the M−1 apart pixel (S245: NO), the CPU 210 proceeds to S255.

In S250, the CPU 210 specifies each pixel different from the black pixel between the target pixel and the M−1 apart pixel as the white pixel. In this case, the CPU 210 updates the value of the flag corresponding to each pixel different from the black pixel between the target pixel and the M−1 apart pixel to a value ("2" in the present example) representing the white pixel. When the M−1 apart pixel is the pixel SP17 of FIG. 11A, the pixel SP17 is specified as the white pixel. When the target pixel is the pixel TP17 of FIG. 11A, and the M−1 apart pixel is the pixel SP17, a pixel SP20 between the pixel TP17 and the pixel SP17 is specified as the white pixel.

In S255, the CPU 210 determines whether all the four directions (upward, downward, leftward, and right ward directions) have been checked. When there is any unchecked direction (S255: NO), the CPU 210 returns to S215 and selects the unchecked direction as the check direction. When all the four directions have been checked (S255: YES), the CPU 210 proceeds to S260.

In S260, the CPU 210 determines whether all the pixels in the scan image SI have been processed as the target pixel. When there is any unprocessed pixel (S260: NO), the CPU 210 returns to S205 and selects the unprocessed pixel as the target pixel. When all the pixels have been processed (S250: YES), the CPU 210 ends the white pixel specifying process.

According to the white pixel specifying process, distant pixels which are located out of the prescribed range from the target pixel is free from the determinations S230-S245. Here, each distant pixel is separated from the target pixel farther than the M−1 apart pixel from the target pixel. After performing all the determinations S230-S245 for each target pixel (S260: YES), pixels, which are not the black pixel and are separated from the each target pixel than the M−1 apart pixel from the each target pixel, are determined as neither the black pixel nor the white pixel, and thus the colors of these pixels are maintained in the replacement process S45.

According to the white pixel specifying process described above, when the pixel (e.g., pixel SP17 of FIG. 11A) apart by "M−1"-number of pixels from the black pixel in a prescribed check direction is not the black pixel and has a value falling within the white color range, the M−1 apart pixel (SP17) is specified as the white pixel (S230 to S240). In other words, when the M−1 apart pixel should have (or is inferred to or have) a color different from the color of the black pixel (or the color inferred to represent the black color) and has a color closer to white than to black, it is specified as the white pixel. Here, the M−1 apart pixel is a candidate for the pixel representing one of colors different from the black color. As a result, the white pixel can be appropriately specified from among the pixels in the periphery of the black pixel. For example, a pixel representing a white background and located periphery of the black pixel on the edge of a character can be appropriately specified as the white pixel.

When a pixel between the black pixel and the white pixel is neither the white pixel nor black pixel, the boundary between black and white may not clear. In the present example, when the pixel apart or separated by "M−1"-number of pixels from the black pixel, ("M" is an integer equal to or larger than 2) from the black pixel in a specific checking direction is specified as the white pixel, pixels which are not the black pixel are specified as the white pixel among intermediate pixels located between the black pixel and the M−1 apart pixel (S245 and S250). This can prevent the pixel located between the black pixel and the white pixel from being determined to be a pixel different from the white pixel and black pixel. Thus, the boundary between black and white can be effectively emphasized.

As described above, it is determined whether each peripheral pixel of the black pixel, specifically, each pixel separated from the black pixel by at most "M−1"-number of pixels satisfies a specifying condition including a condition that the pixel is not the black pixel. That is, the peripheral pixels are pixels separated from the black pixel by M-pixels worth of distance. When the specifying condition is satisfied for the peripheral pixel of the black pixel, the peripheral pixel is specified as the white pixel. On the other hand, a plurality of distant pixels (e.g., pixel SP21 of FIG. 11A) farther from the black pixel than the peripheral pixels from the black pixel, specifically, the pixels separated from the black pixel by more than "M−1"-number of pixels is not subjected to determination under the specifying condition. In other words, the specifying condition is met for a specific pixel from among the plurality of peripheral pixels when the specific pixel having a color different from the color inferred to (determined) represent the black color and closer to the white color than to the black color.

As a result, a plurality of pixels (e.g., pixel SP20 of FIG. 11A) in the intermediate area MA that is located closer to the outer area BA than to the inner area TA is specified as the white pixel (corresponding flag=2) as illustrated in FIG. 11B. These pixels are adjacent to the black pixel and not specified as the black pixel among the plurality of pixels in the intermediate area MA. A plurality of pixels (e.g., pixel SP17 of FIG. 11A), which is located in the outer area BA and adjacent to the intermediate area MA, is specified as the white pixel (flag=2). A plurality of pixels (e.g., pixel SP21 of FIG. 11A), which is located in the outer area BA and separated by two or more pixels from the black pixel, is specified neither as the white pixel nor black pixel (flag=0).

A further concrete example will be described with reference to FIGS. 12A and 12B. FIGS. 12A and 12B are second explanatory views of the white pixel specifying process. FIG. 12A illustrates an enlarged view of the upper edge in a manner similar to FIG. 8A. FIG. 12B illustrates the flag data corresponding to the area in the scan image SI illustrated in FIG. 12A. In the case of the upper edge, when a pixel TP18 which is the black pixel is selected as the target pixel, the pixel SP22 is not the black pixel and has a value falling within the white color range among pixels SP22-SP25 apart from the target pixel TP 18 by "M−1"-number of pixel(s) (one pixel in FIG. 12A) in the respective four directions, and thus the pixel SP22 is specified as the white pixel (S230 to S240). A pixel SP26 located between the pixel TP18 and the pixel SP22 is not the black pixel, and is thus specified as the white pixel. A pixel SP27 separated by two pixels from the pixel TP18 is the distant pixel, and is thus not subjected to determination under the above specifying condition. So, the pixel SP27 is not specified as the white pixel. Thus, as illustrated in FIG. 12B, a plurality of pixels (e.g., pixel SP26 of FIG. 12A), which is located in the intermediate area MA and is closer to the outer area BA than to the inner area TA, is specified as the white pixel (flag=2). A plurality of pixels (e.g., pixel SP22 of FIG. 12A), which is located in the outer area BA and is adjacent to the intermediate area MA, is specified as the white pixel (flag=2). A plurality of pixels (e.g., pixel SP27 of FIG. 12A), which is located in the outer area BA and is separated by two or more pixels from the black pixel, is specified neither as the white pixel nor black pixel (flag=0).

Although not illustrated, in the right edge (FIG. 7A) and the left edge (FIG. 9A), the plurality of pixels, which is located in the intermediate area MA and is closer to the outer area BA than to the inner area TA is specified as the white pixel. A plurality of pixels, which is located in the outer area BA and is adjacent to the intermediate area MA is specified as the white pixel. The plurality of pixels separated by two or more pixels from the black pixel is specified neither as the white pixel not black pixel.

Figure 13A:
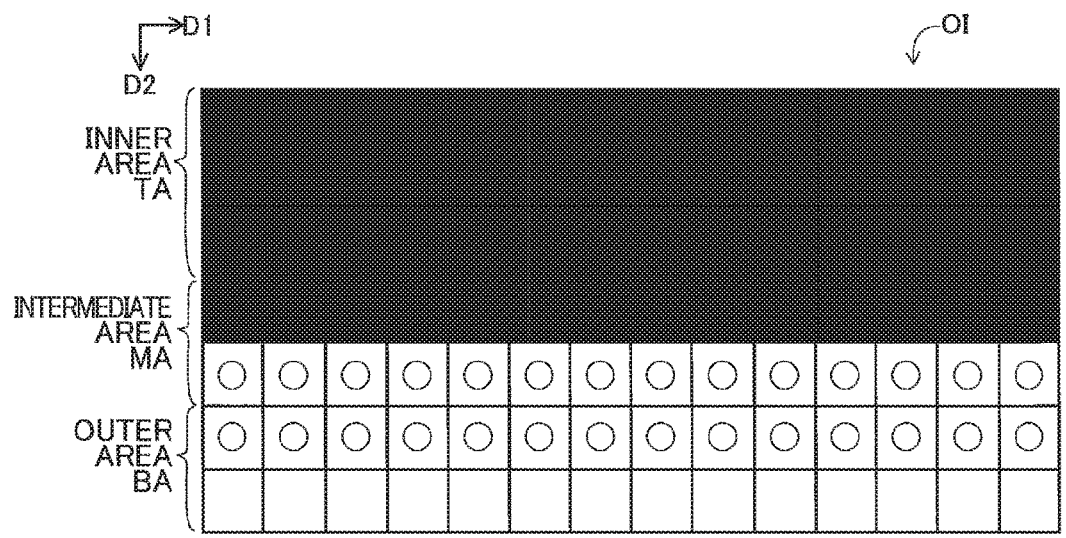
FIGS. 13A and 13B illustrate enlarged views of processed image OI corresponding respectively to the lower edge shown in FIG. 11A and the upper edge of FIG. 12A shown in FIG. 12A.
Figure 13B:
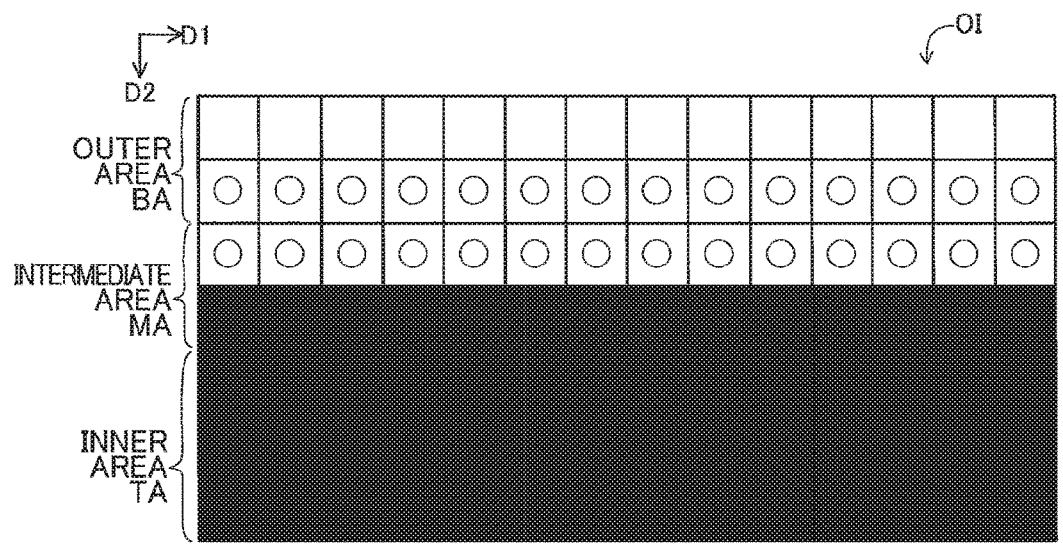

FIGS. 13A and 13B are explanatory views of the processed image. FIGS. 13A and 13B illustrate enlarged views of processed image OI corresponding respectively to the lower edge of FIG. 11A and the upper edge of FIG. 12A. When the replacement process of S45 in FIG. 2 is executed using the above specifying result of the black and white pixels, processed image data representing the processed image OI shown in FIGS. 13A and 13B is generated. In this processed image OI, the black pixel corresponds to the specified black pixel in the scan image SI and is a pixel (referred to as "black-replaced pixel") having a black color as a result of the replacement. Further, in this processed image OI, the white pixel added with a round mark corresponds to the specified white pixel and is a pixel (referred to as "white-replaced pixel") having a white color as a result of the replacement. Further, in the processed image OI, the white pixel not added with the round mark is a corresponding distant pixel corresponding to the distant pixel (pixel specified neither as the white pixel nor black pixel). As described above, the processed image OI includes the plurality of black-replaced pixels, the plurality of white-replaced pixels, and the plurality of distant pixels. As a result, in the processed image OI, the boundary between black and white can be clarified. Each of the plurality of distant pixels has a value of a pixel corresponding to that in the sharpened image FI (FIG. 3D), and can thus have a color different from white and black. This can prevent the distant portion apart from the boundary between black and white from being excessively influenced by the process for clarifying the boundary between black and white. For example, when the white background Bg1 is not complete white but includes a light pattern or a light color in the scan image SI, the light pattern or light color of the background Bg1 can be prevented from degrading in image quality due to disappearance of the light pattern or light color. Further, when a light-colored object (e.g., drawing) exists neighboring a black character in the scan image SI, the object can be prevented from degrading in appearance due to replacement of the color of a part of the object with a white color.

Further, in the above example, the black pixel is specified from among the plurality of edge pixels specified by the binary image data (S110 of FIG. 5). That is, the black pixel is specified from a pixel group including the plurality of edge pixels in the scan image SI specified by the edge pixel specifying process of S15 in FIG. 2 and not including at least some of the plurality of pixels different from the plurality of edge pixels. As a result, the edge constituting the boundary between black and white can be clarified without changing a portion different from the edge, e.g., a portion having a uniform color in the scan image SI. For example, degradation in image quality due to a change in color of a portion different from the edge in the scan image SI can be prevented.

Further, the expansion/contraction process is executed in S20 of FIG. 2, and the black pixel is specified from among the plurality of edge pixels specified by the binary data after the expansion/contraction process. As a result, the black pixel is specified from among the plurality of more appropriate edge pixels, so that the boundary between black and white can be clarified appropriately. For example, as described with reference to FIGS. 4A to 4B, when the specified edge includes a crack CR or a gap NT, a pixel that should be specified as the black pixel may not be specified as the black pixel. However, execution of the expansion/contraction process can prevent such a problem, whereby the boundary between black and white can be clarified more appropriately.

Generally, it is considered that the higher the resolution is, the larger the number of blurred pixels becomes around a black character. Thus, preferably, the higher the resolution is, the larger the number of pixels that are replaced with a white color around the black character. According to the above example, the number M of pixels to be checked is set to a first value (e.g., "2") when the resolution of the scan data in a specific direction is a first resolution (e.g., 600 dpi) and set to a second value (e.g., "4") larger than the first value when the resolution of the scan data in the specific direction is a second resolution (e.g., 1200 dpi) higher than the first resolution (S200). As a result, the edge constituting the boundary between black and white can be emphasized appropriately according to the resolution of the scan data.

B. Modifications (1) In the above example, in order to clarify the boundary between black and white, the black pixel that should have a black color and the white pixel that should have a white color are specified (S25 and S30 of FIG. 2). Alternatively, in order to clarify the boundary between other colors, e.g., cyan and magenta, a cyan pixel that should have (or inferred to have) a cyan color and a magenta pixel that should have (or inferred to have) a magenta color may be specified. In general, a plurality of first pixels that should have (or inferred to have) a first color and a plurality of second pixels that should have (or inferred to have) a color different from the first color are preferably specified.

Assuming that the image is subjected to printing, the first and second colors are preferably two colors selected from among colors of a plurality of types of color materials used in printing and the base color of a paper sheet to be used in printing. For example, the first and second colors are preferably two colors selected from among five colors consisting of cyan, magenta, yellow, and black which are colors of the color materials used in printing and white which is the base color of a paper sheet. In this case, the boundary between the first and second colors is maintained in a clear state even in a printed image (halftone image) obtained by applying the halftone process to the processed image data. The first color may correspond to a color having a maxim gradation level and the second color may correspond to a color having a minimum gradation level in a prescribed color space. Alternatively, the first color may correspond to a color having a minimum gradation level and the second color may correspond to a color having a maximum gradation level in a prescribed color space.

Further, a color (white, in the present example) to be specified as the background color has preferably brightness equal to or higher than a prescribed reference. For example, assuming that the brightness of complete black is 0 and that the brightness of complete white is 100, a color to be specified as the background color has preferably brightness equal to or higher than 70. In this case, contrast between the color of the background and the color of an object such as a character is likely to become high. Thus, in the processed image OI, the boundary between an object such as a character and its background is likely to be clearly visible. So, a pixel whose brightness is equal to or higher than the prescribed reference may be specified as a pixel included in the white color range.

(2) In the black pixel specifying process of FIG. 5, the black pixel is specified from among the plurality of edge pixels specified by the binary image data (S110). Alternatively, the black pixel may be specified from among all the pixels in the scan image SI for example. That is, S110 of FIG. 5 may be omitted.

(3) In the black pixel specifying process of FIG. 5, the conditions for specifying the black pixel are examples and not limited thereto. For example, each pixel having a value falling within a range which includes a black color and is narrower than the second black range of the example may be specified as the black pixel.

(4) In the white pixel specifying process of FIG. 10, the conditions for specifying the white pixel are examples and not limited thereto. For example, pixels not being the black pixel and being closest to white may be specified as the white pixel from among a plurality of pixels adjacent to the black pixel in the four directions. The number M of pixels to be checked in the above example may be a fixed value (e.g., 2) irrespective of the reading resolution of the scan data.

(5) In the above example, the value of each of the pixels constituting the scan data is represented by the RGB value, but may be represented by a color value of another color system. For example, the value of each of the pixels constituting the scan data may be represented by a color value of a CMY color system including three component values of C, M, and Y.

(6) In the above example, the edge sharpening process is applied to the edge pixels (S40 of FIG. 2), and the halftone-dot smoothing process is applied to the non-edge pixels (S35 of FIG. 2). Alternatively, an anti-alias process for improving appearance of a character may be applied to the edge pixels. Further, a process for washing out color (process for converting the pixel color into white) may be applied to the non-edge pixels for the purpose of reducing the amount of color materials in printing. Generally, it is preferable to perform an image process performed on the edge pixel is different from an image process performed on the non-edge pixels. Alternatively, a specific image process may be applied to only one of the edge and non-edge pixels.

(7) In the above example, the scan data is used as the target image data. Alternatively, the target image data may be generated by a digital camera provided with a two-dimensional image sensor reading a printed matter.

(8) In the above example, the processed image based on the processed image data is subject for printing (S50 and S55 of FIG. 2). Alternatively, the processed image may be subject for displaying on a display part such as a liquid crystal display.

(9) The image processing apparatus performing the image process of FIG. 2 is not limited to the multifunction peripheral 200, but may be various devices. For example, a scanner or a digital camera may execute the image process of FIG. 2 on target image data generated by itself so as to generate print data to be supplied to a printer. Further, for example, a terminal device (for example, the terminal device 100) or a server (not illustrated) that can communicate with a scanner and a printer may execute the image process of FIG. 2 on target image data acquired from the scanner to generate print data to be supplied to the printer. Further, a plurality of computers (for example, cloud servers) communicable with one another through a network may execute the image process as a whole while sharing the function required for the image process among them. In this case, the plurality of computers is an example of the image processing apparatus.

(10) In the embodiment described above, some of the configurations implemented through hardware may be replaced by software, and conversely some of the configurations implemented through software may be replaced by hardware. For example, the edge sharpening process of S40 and the replacement process of S45 in FIG. 2 may be executed by dedicated hardware such as an ASIC.

While the description has been made in detail with reference to the specific embodiment, the embodiment described above is an example for making the present disclosure easier to understand and does not limit the present disclosure. It would be apparent to those skilled in the art that various changes and modifications may be made thereto.

What is claimed is:

1. An image processing apparatus comprising a processor configured to perform:
    acquiring target image data representing a target image, the target image including a plurality of pixels, the plurality of pixels having respective ones of a plurality of pixel values, each of the plurality of pixel values having a gradation value, total levels of the gradation value being larger than three;
    specifying a plurality of target pixels from among the plurality of pixels;
    specifying a plurality of first pixels from among the plurality of target pixels, each of the plurality of first pixels being a candidate for a pixel representing a first color;
    specifying a plurality of peripheral pixels of each first pixel which is located within a prescribed range from the each first pixel;
    determining whether a specific condition is met for each peripheral pixel, the specific condition including a condition that the each peripheral pixel is a candidate for a pixel representing one of colors different from the first color, wherein a plurality of distant pixels of the each first pixel is located out of the prescribed range from the each first pixel, is not specified as a peripheral pixel of the each first pixel, and is free from determining whether the specific condition is met;
    specifying, as a second pixel, each of the plurality of peripheral pixels meeting the specific condition, the second pixel being a candidate for a pixel representing a second color different from the first color; and
    performing an image process on the target image data by using each of specified first pixels and each of specified second pixels to generate processed image data representing a processed image,
    wherein the processed image includes a plurality of first processed pixels, a plurality of second processed pixels, and a plurality of processed third pixels, the plurality of first processed pixels corresponding to respective ones of the specified first pixels and having the first color, the plurality of second processed pixels corresponding to respective ones of the specified second pixels and having the second color, each of the plurality of processed third pixels having a color different from the first color and the second color and corresponding to a pixel in the target image for which the determining whether the specific condition is met has not been performed.

2. The image processing apparatus according to claim 1, wherein the processor is configured to further perform specifying a plurality of edge pixels, each of the plurality of edge pixels constituting an edge in the target image, wherein the plurality of target pixels includes at least one of the plurality of edge pixels but excludes at least one non-edge pixel.

3. The image processing apparatus according to claim 2, wherein the processor is configured to further perform executing an expansion process on the target image data and a contraction process on the expansion-processed target image data, the expansion process expanding the edge and the contraction process contracting the expanded edge, wherein the plurality of target pixels is specified on the basis of the edge in the target image data after the expansion process and the contraction process are performed.

4. The image processing apparatus according to claim 1, wherein the processor determines that the specific condition is met for a specific pixel from among the plurality of peripheral pixels when the specific pixel is a candidate for a pixel representing a color different from the first color and closer to the second color than to the first color.

5. The image processing apparatus according to claim 4, wherein at least one intermediate pixel is interposed between the first pixel and the specific pixel in a specific direction,
wherein the processor determines that the specific condition is met for the at least one intermediate pixel when the at least one intermediate pixel is a pixel which is a candidate for a pixel representing a color different from the first color.

6. The image processing apparatus according to claim 5, wherein the specific pixel is set so that number of all pixel interposed between the first pixel and the specific pixel in the specific direction is first number when the target image data has a first resolution in the specific direction and that the number is second number larger than the first number when the target image data has a second resolution greater than the first resolution in the specific direction.

7. The image processing apparatus according to claim 1, wherein the processor is configured to further perform:
determining whether a first determination condition is met for each target pixel, the first determination condition including a condition that a difference between a pixel value of the each target pixel and a pixel value of the first color falls within a prescribed range;
determining whether a second determination condition is met for the each target pixel when the first determination condition is met for the each target pixel, the second determination condition concerning pixel values of a plurality of second peripheral pixels of the each target pixel; and
specifying the each target pixel as the first pixel when the second determination condition is met for the each target pixel,
wherein when the first determination condition is not met for the each target pixel, the each target pixel is free from determining whether the second determination condition is met.

8. The image processing apparatus according to claim 1, wherein the plurality of target pixels includes a first target pixel, a second target pixel located downstream of and adjacent to the first target pixel in a specific direction, and a third target pixel located downstream of and adjacent to the second target pixel in the specific direction, the second target pixel meeting a condition concerning the first pixel,
wherein the processor is configured to further perform:
determining whether a first determination condition is met, the first determination condition including a condition that the first target pixel is the first pixel;
specifying the second target pixel as the first pixel when the first determination condition is met;
determining whether a second determination condition is met when the first determination condition is not met, the second determination condition including a condition that a difference between a pixel value of the third target pixel and a pixel value of the first color falls within a second prescribed range; and
specifying the second target pixel as the first pixel when the second determination condition is met.

9. The image processing apparatus according to claim 1, wherein the second color is a color having a brightness equal to or higher than a reference value.

10. The image processing apparatus according to claim 1, wherein the processor is configured to further perform executing a smoothing process on the target image data for smoothing the target image to generate intermediate image data,
wherein the processed image data is generated by using the intermediate image data.

11. The image processing apparatus according to claim 10, wherein the processor is configured to further perform specifying a plurality of edge pixels, each of the plurality of edge pixels meeting a condition concerning an edge in the target image,
wherein the intermediate image data is generated by executing an edge sharpening process on pixel values of the plurality of edge pixels to sharpen the edge in the target image and executing the smoothing process on pixel values of a plurality of non-edge pixels.

12. The image processing apparatus according to claim 1, wherein each of the plurality of pixel values has a red component value, a blue component value, and a green component value.

13. The image processing apparatus according to claim 1, wherein the processor is configured to further perform generating printing data by using the processed image data.

14. The image processing apparatus according to claim 1, wherein the target image data is generated by using an image sensor.

15. A non-transitory computer readable storage medium storing a set of program instructions for installation on and execution by a computer, the set of program instructions comprising:
acquiring target image data representing a target image, the target image including a plurality of pixels, the plurality of pixels having respective ones of a plurality of pixel values, each of the plurality of pixel values having a gradation value, total levels of the gradation value being larger than three;
specifying a plurality of target pixels from among the plurality of pixels;
specifying a plurality of first pixels from among the plurality of target pixels, each of the plurality of first pixels being a candidate for a pixel representing a first color;
specifying a plurality of peripheral pixels of each first pixel which is located within a prescribed range from the each first pixel;
determining whether a specific condition is met for each peripheral pixel, the specific condition including a condition that the each peripheral pixel is a candidate for a pixel representing one of colors different from the first color, wherein a plurality of distant pixels of the each first pixel is located out of the prescribed range from the each first pixel, is not specified as a peripheral pixel of the each first pixel, and is free from determining whether the specific condition is met;

specifying, as a second pixel, each of the plurality of peripheral pixels meeting the specific condition, the second pixel being a candidate for a pixel representing a second color different from the first color; and performing an image process on the target image data by using each of specified first pixels and each of specified second pixels to generate processed image data representing a processed image, wherein the processed image includes a plurality of first processed pixels, a plurality of second processed pixels, and a plurality of processed third pixels, the plurality of first processed pixels corresponding to respective ones of the specified first pixels and having the first color, the plurality of second processed pixels corresponding to respective ones of the specified second pixels and having the second color, each of the plurality of processed third pixels having a color different from the first color and the second color and corresponding to a pixel in the target image for which the determining whether the specific condition is met has not been performed.

16. An image processing method comprising:

acquiring target image data representing a target image, the target image including a plurality of pixels, the plurality of pixels having respective ones of a plurality of pixel values, each of the plurality of pixel values having a gradation value, total levels of the gradation value being larger than three;

specifying a plurality of target pixels from among the plurality of pixels;

specifying a plurality of first pixels from among the plurality of target pixels, each of the plurality of first pixels being a candidate for a pixel representing a first color;

specifying a plurality of peripheral pixels of each first pixel which is located within a prescribed range from the each first pixel;

determining whether a specific condition is met for each peripheral pixel, the specific condition including a condition that the each peripheral pixel is a candidate for a pixel representing one of colors different from the first color, wherein a plurality of distant pixels of the each first pixel is located out of the prescribed range from the each first pixel, is not specified as a peripheral pixel of the each first pixel, and is free from determining whether the specific condition is met;

specifying, as a second pixel, each of the plurality of peripheral pixels meeting the specific condition, the second pixel being a candidate for a pixel representing a second color different from the first color; and performing an image process on the target image data by using each of specified first pixels and each of specified second pixels to generate processed image data representing a processed image, wherein the processed image includes a plurality of first processed pixels, a plurality of second processed pixels, and a plurality of processed third pixels, the plurality of first processed pixels corresponding to respective ones of the specified first pixels and having the first color, the plurality of second processed pixels corresponding to respective ones of the specified second pixels and having the second color, each of the plurality of processed third pixels having a color different from the first color and the second color and corresponding to a pixel in the target image for which the determining whether the specific condition is met has not been performed.

* * * * *